US009194096B2

(12) United States Patent
Fergeson

(10) Patent No.: US 9,194,096 B2
(45) Date of Patent: Nov. 24, 2015

(54) SYSTEM AND METHOD FOR CONSTRUCTING MODULAR CONCRETE DUCTS

(75) Inventor: L. Paul Fergeson, Jonesboro, AR (US)

(73) Assignee: Southern Cast Products, Inc., Jonesboro, AR (US)

(*) Notice: Subject to any disclaimer, the term of this patent is extended or adjusted under 35 U.S.C. 154(b) by 44 days.

(21) Appl. No.: 13/427,189

(22) Filed: Mar. 22, 2012

(65) Prior Publication Data
US 2013/0248680 A1 Sep. 26, 2013

(51) Int. Cl.
B28B 1/087 (2006.01)
B28B 7/00 (2006.01)
(Continued)

(52) U.S. Cl.
CPC .............. *E02D 29/12* (2013.01); *B28B 1/087* (2013.01); *B28B 7/0014* (2013.01); *B29C 33/301* (2013.01); *B29C 33/306* (2013.01); *B29C 45/376* (2013.01); *B28B 1/0873* (2013.01); *B29C 2045/378* (2013.01); *Y10T 29/4978* (2015.01); *Y10T 29/49826* (2015.01)

(58) Field of Classification Search
CPC .......... B28B 1/08; B28B 7/0041; B28B 7/28; B28B 7/30; B28B 15/005; B28B 1/0873; B28B 7/0032; B28B 7/02; B28B 1/087; B28B 7/0014; B28D 1/30; B29C 33/306; B29C 33/302; B29C 33/305; B29C 33/308; B29C 2045/378; B29C 33/301; B29C 45/376; Y10T 29/4978; Y10T 29/49826; E02D 29/12
USPC ......... 425/183, 184, 186, 195, 253, 255, 392, 425/393, 403, 414, 421, 424, 432, 441, 425/436 RM, 447, 450.1, 451, 451.9, 425/452–454, 456, 460, 468, 412; 249/18–25, 63, 122, 124–126, 134, 249/135, 139, 142–144, 146, 147, 149, 249/154–157, 159, 160, 163–168, 177, 184, 249/186, 210, 212, 175, 163–168
See application file for complete search history.

(56) References Cited

U.S. PATENT DOCUMENTS 3,679,168 A * 7/1972 Weaver et al. ................ 249/196
4,121,804 A * 10/1978 O'Leary .................... 249/187.1
(Continued)

FOREIGN PATENT DOCUMENTS

JP 05033489 A * 2/1993 ............. E04G 11/28

OTHER PUBLICATIONS

American Manufacturing Group brochure, ASTM International Publishing New Standards for Precast Concrete Box Culvert Sections Using Rubber Gaskets, undated.

*Primary Examiner* — James Sanders
*Assistant Examiner* — Leith S Shafi
(74) *Attorney, Agent, or Firm* — Schrantz Law Firm, PLLC; Stephen D. Schrantz

(57) ABSTRACT

Modular mold equipment for producing concrete culverts with tight tolerances. Modular mold equipment having a coupling plate is used to align and interconnect components of the mold. The components being aligned may have recesses for receiving the coupling plate. Modular mold equipment system with an extended size range to cover all standard concreted duct product sizes. Modular mold equipment having a pallet guide adjustment mechanism adapted for setting the pallet at a desired location in relation to a form. The desired location is based on a wall thickness of a concrete culvert to be produced. Modular mold equipment having a core that includes a core corner and another core component adapted to be coupled to the core corner, and locking apparatus adapted to lock the core corner to the other core component via a mechanism that extends outside the core.

21 Claims, 24 Drawing Sheets

(51) Int. Cl.
*E02D 29/12* (2006.01)
*B29C 33/30* (2006.01)
*B29C 45/37* (2006.01)

(56) References Cited

U.S. PATENT DOCUMENTS

| | | | |
|---|---|---|---|
| 4,123,034 A * | 10/1978 | Crunk et al. | 249/156 |
| 4,915,345 A * | 4/1990 | Lehmann | 249/18 |
| 5,174,909 A * | 12/1992 | Ward | 249/44 |
| 5,454,544 A * | 10/1995 | Del Zotto | 249/83 |
| 6,105,924 A * | 8/2000 | Carr | 249/63 |
| 6,322,046 B1 * | 11/2001 | Yurick | 249/219.1 |
| 6,712,546 B1 * | 3/2004 | Radu et al. | 404/8 |
| 6,827,326 B2 * | 12/2004 | Giri | 249/165 |
| 8,926,311 B1 * | 1/2015 | Schmidgall | 425/432 |
| 2004/0079861 A1 * | 4/2004 | Giri | 249/163 |
| 2004/0159060 A1 * | 8/2004 | Giri et al. | 52/415 |
| 2006/0022369 A1 * | 2/2006 | Giri et al. | 264/71 |
| 2009/0146043 A1 * | 6/2009 | Gates | 249/103 |

* cited by examiner

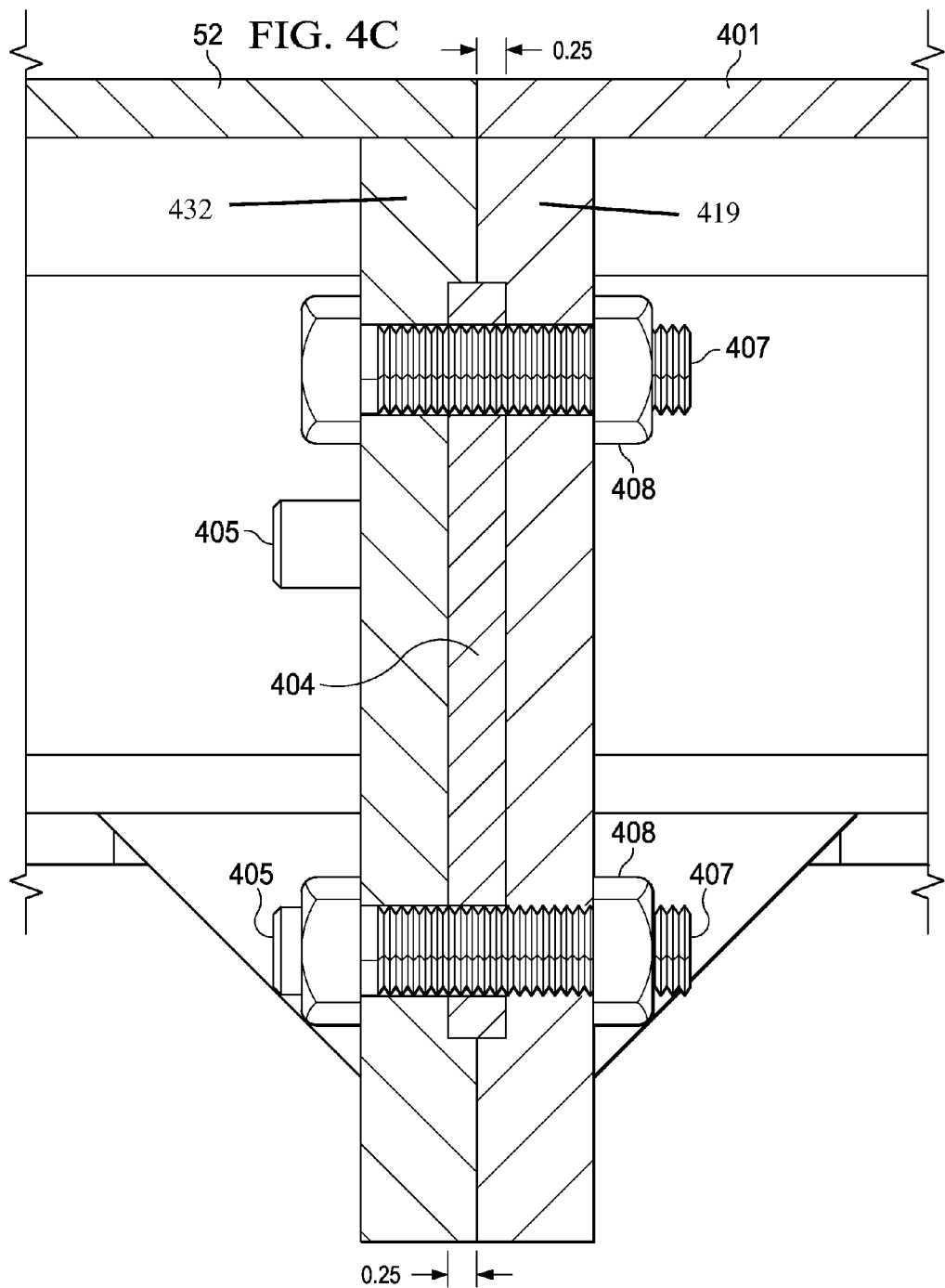

702

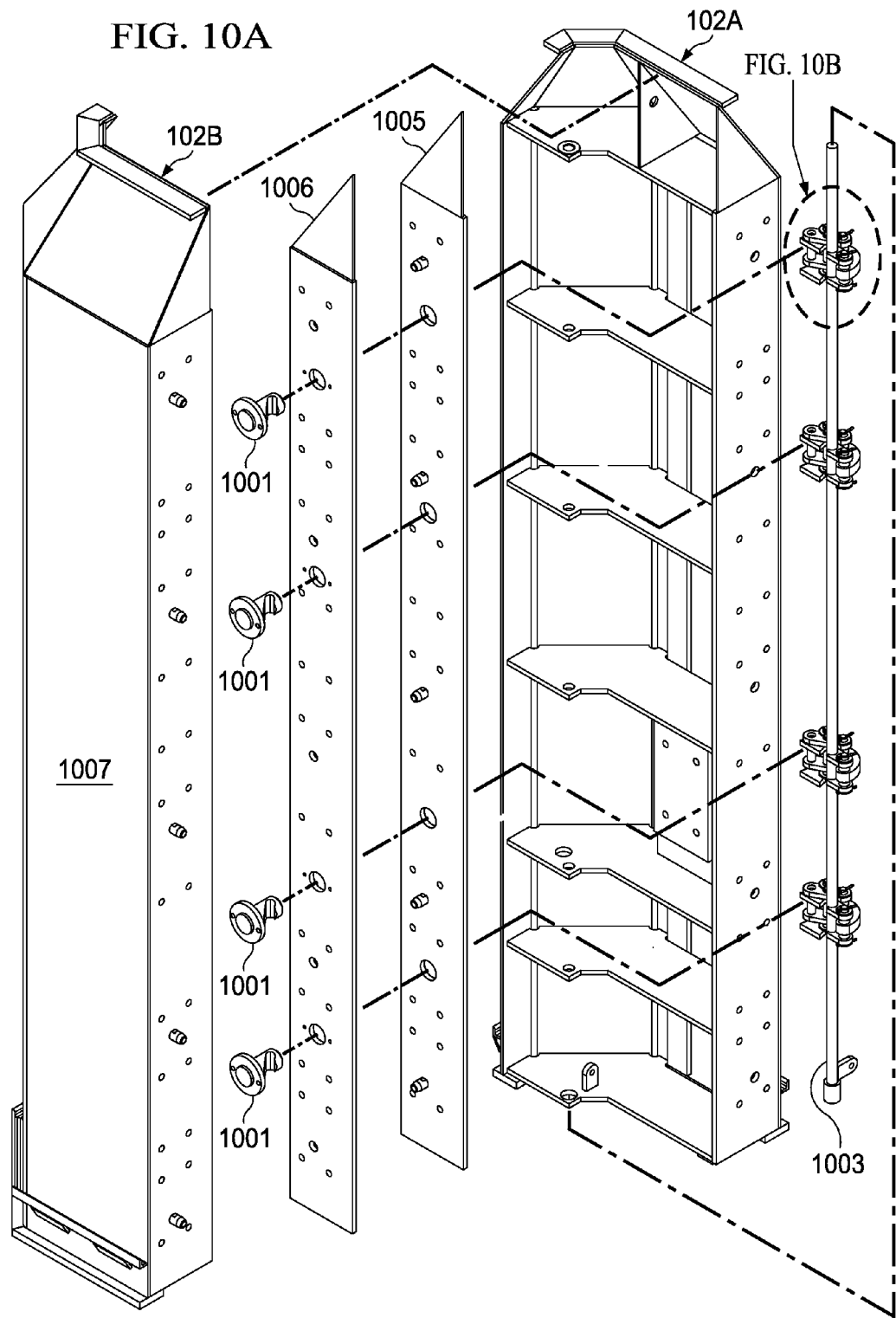

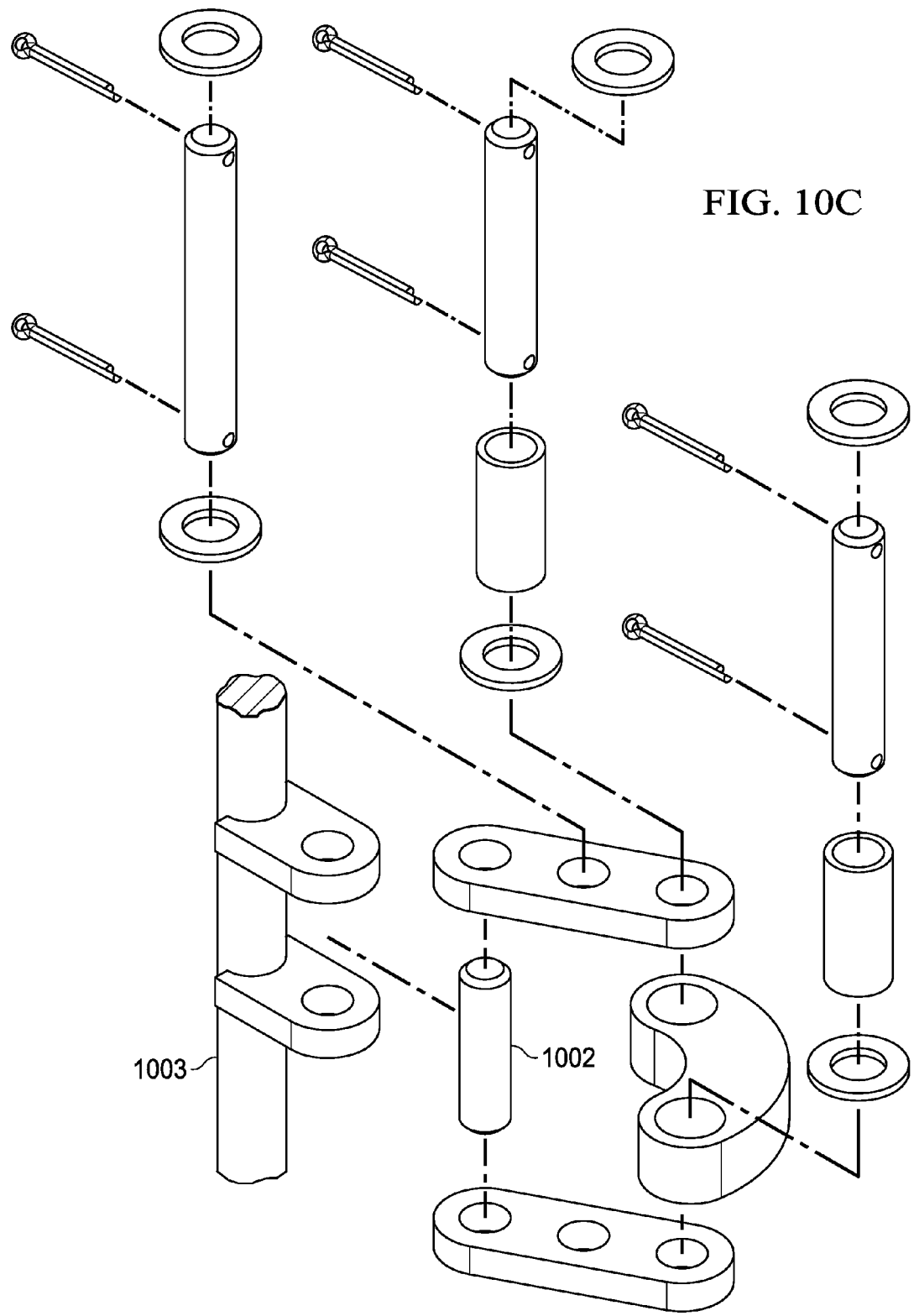

SYSTEM AND METHOD FOR CONSTRUCTING MODULAR CONCRETE DUCTS

TECHNICAL FIELD

This disclosure relates to concrete duct structures and more particularly to systems and methods for fabricating concrete duct structures using modular techniques.

BACKGROUND OF THE INVENTION

It is common to construct concrete duct structures that are designed to contain materials as they move from one location to another. The moving material is typically water. The ducts can be found in any environment, but usually they are placed underground to contain water movement.

Concrete ducts are put together in sections, with each section having a top, bottom and sides. Each section also has a male end (tongue or spigot) and a header female end (groove or socket) which then allows sections to be put together to create an extended duct. In order to properly contain fluids from escaping out of the duct and from preventing fluids and debris from entering the duct, a gasket is fitted to the male end to serve as a seal between the male and female ends upon mating of the sections.

It is imperative that the gasket be compressed a certain amount, typically defined by a percent of gasket compression. If the gasket is not compressed enough the duct connection could leak and if the gasket is compressed too much duct cracking could occur.

Theoretically, concrete ducts, which are measured by their inside dimension, can be any size. However, in actual practice there are certain standard interior sizes. The outer size, which is determined by the thickness of the respective walls, depends upon many factors, such as, depth underground, intended use, etc. Thus, it is necessary to be able to construct concrete ducts having varying dimensions and wall thicknesses.

Concrete ducts are formed by pouring (or shaking) concrete into a mold and then removing the mold when the concrete is dry (or compressed as in the case of near zero slump cast concrete). These molds must be constructed for each duct size and can be constructed on or near the point of installation. One major problem with current construction is manufacturing tolerances, which among other things, results in the gasket not being properly compressed.

Some prior art modular systems are large systems having a right and a left corner configuration. The primary reason for the different corner configurations is because the typical smallest size duct (interior) is 3 ft. by 2 ft. Thus, one corner has a leg of 3 ft. while the other corner has a leg of 2 ft. It is difficult to hold tight tolerance in larger structures, such as this for several reasons.

Some prior art modular systems with universal configuration for pallets and headers require two very different sets of mold equipment. For example, one set may cover a 4 ft.×2 ft. through 8 ft.×8 ft. product size with an 8 in. haunch size. The other set may cover a 6 ft.×3 ft. through 12 ft.×12 ft. product size with a 12 in. haunch size. There is an overlap in product size for the 6 ft., 7 ft. and 8 ft. span products when using the two different sets of equipment. When using the standard configuration set the 3 ft. span products were not addressed.

Because tolerances are hard to maintain, the industry has shied away from using rubber gasketed joints. Instead, they've used what's called a mastic joint which is a form of mortar joint. Workers would plaster mortar into the female end and then mate the male end of the next section. This mortar joint has been changed to a petroleum mastic product, but it remains difficult to obtain a water tight seal.

BRIEF SUMMARY OF THE INVENTION

Appropriate tolerances of concrete ducts (culverts) may be achieved by ensuring that the mold assemblies that form these concrete ducts are made to tight tolerances. For example, according to embodiments of the invention, concrete ducts can be made with tight tolerances, especially at the male and female ends, by using small modular sections to fabricate pallets and headers that mold these sections respectively. By using relatively small sections to fabricate the molds, and by removing the stress from each section, tight machining tolerances are achieved on a section by section basis. Further, in embodiments of the invention, a coupling plate is used to align and interconnect components of the mold. The components being aligned may have recesses for receiving the coupling plate. For example, coupling plates are used to align and interconnect components such as bolt-on slabs and wall spacers used to change the configuration of a pallet of the mold when a concrete duct with a thicker slab and wall needs to be made. By the use of the coupling plate/recess mechanism, precision is maintained regardless of the thickness of the walls being produced by the mold. Furthermore, in part due to the coupling plate/recess mechanism, embodiments of the invention include a modular mold equipment system with an extended size range to cover all standard concrete duct product sizes.

Embodiments of the invention include a modular mold for producing concrete culverts that includes a plurality of modular components adapted to be coupled together to create the mold. The mold includes a coupling plate adapted to couple and align at least two of the modular components with each other, wherein each of the at least two components include a recess for receiving the coupling plate.

Embodiments of the invention include a modular pallet of a mold for producing a male end of a concrete culvert. The pallet includes a corner component and a wall adapter component. The wall adapter component is for changing a wall thickness of the concrete culvert produced by the mold. The pallet also includes a coupling plate adapted to couple and align the corner component and the wall adapter component with each other, wherein each of the corner component and the wall adapter component includes a recess for receiving the coupling plate.

Embodiments of the invention include a method of producing concrete culverts. The method includes assembling a mold from modular components, wherein the assembling includes the use of a coupling plate to couple and align at least two of the modular components with each other and wherein each of the at least two components include a recess for receiving the coupling plate. The method also includes pouring concrete into the mold and vibrating the mold. The mold is then removed from the concrete culvert when the concrete is compacted or cured.

Embodiments of the invention include a modular mold for producing concrete culverts. The modular mold includes a form and a pallet adapted to interface with the form. The pallet includes a pallet guide adjustment mechanism adapted for setting the pallet at a desired location in relation to the form, wherein the desired location is based on a wall thickness of a concrete culvert to be produced. In embodiments, the pallet guide adjustment mechanism includes a pallet guide base having a hole and a pallet guide adjustment shaft that fits into the hole. The pallet guide adjustment mechanism also includes means for locking the shaft to the pallet guide base and means for securing the pallet, the form and the pallet guide base at the desired location.

Embodiments of the invention include a method of assembling a mold. The method includes coupling a form to a pallet. The coupling includes setting the pallet at a desired location in relation to the form using a pallet guide adjustment mechanism. The desired location is based on a wall thickness of a concrete culvert to be produced. The pallet guide adjustment mechanism includes a pallet guide base having a hole, a pallet guide adjustment shaft that fits into the hole, means for locking the shaft to the pallet guide base, means for securing the pallet, the form and the pallet guide base at the desired location, and a tri-square adapted to cooperate with the pallet guide base to establish the desired location.

Embodiments of the invention include a core for use in a modular mold for producing concrete culverts. The core includes a core corner and a core component adapted to be coupled to the core corner. The core also includes a locking apparatus adapted to lock the core corner to the core component via a mechanism that extends outside the core.

Embodiments of the invention include a method of assembling a core for use in a mold for producing concrete culverts. The method includes coupling a core corner to a core component using a locking apparatus adapted to lock the core corner to the core component via a mechanism that extends outside the core.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4C shows a cross sectional view of an installed coupling plate according to embodiments of the invention;

FIGS. 10A-10C show a core locking mechanism according to embodiments of the invention;

DETAILED DESCRIPTION OF THE INVENTION

Figure 2A:
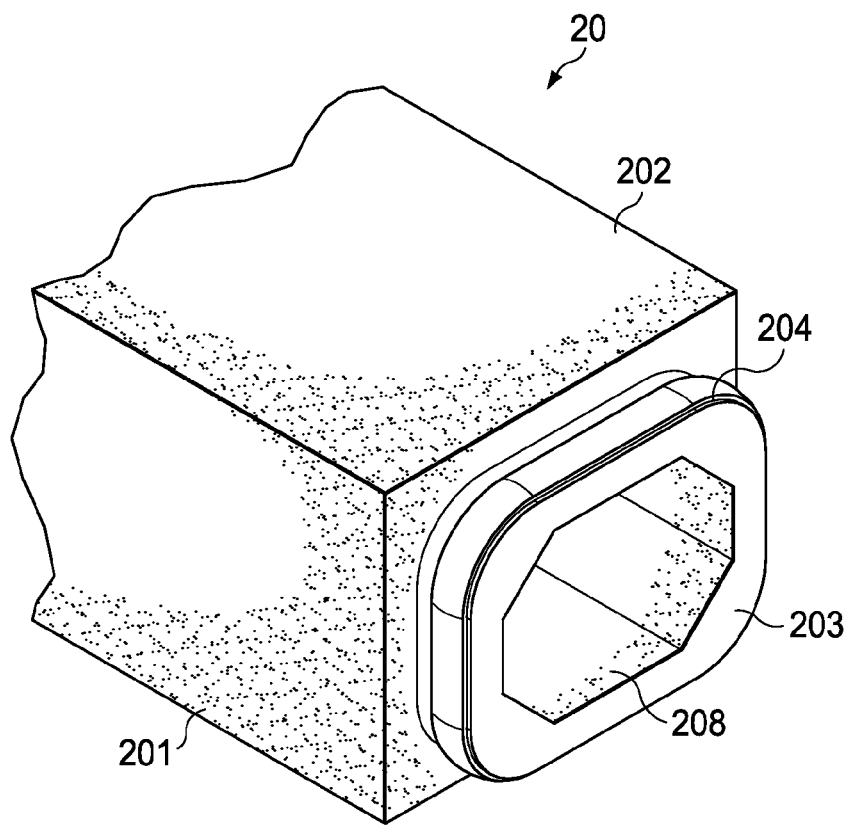
FIGS. 2A and 2B show a box culvert molded according to embodiments of the invention.
Figure 2B:
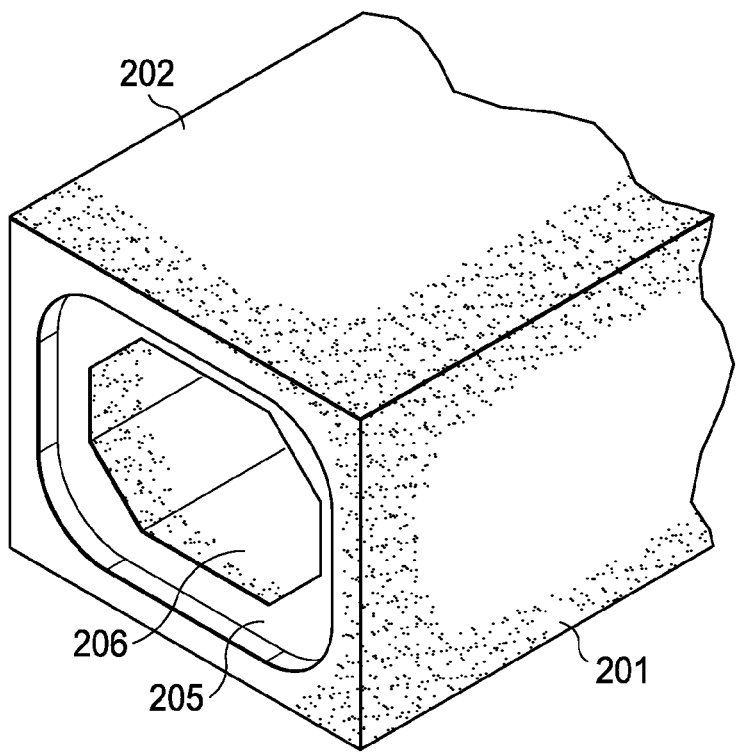

FIGS. 2A and 2B show box culvert 20. Box culvert 20 has a quadrilateral shape whereby the length of top slab 202 defines the span of box culvert 20 and the height of sidewall 201 defines the rise of box culvert 20. Specifically, the span is the horizontal inside dimension or measurement of top slab 202 and the vertical inside dimension or measurement of sidewall 201 is the rise of box culvert 20. Span normally is referred to in terms of feet and is stated before the rise dimension. For example, a 4 ft.×2 ft. box culvert has a span of 4 ft. and a rise of 2 ft. Typically, the dimensions of box culverts range from a 3 ft. span and about 2 ft. rise up to a 20 to 24 ft. span and 12 to 14 ft. rise. Box culvert 20 includes rubber gasket 204, which is used to seal the mating of male end 203 with female end 205. The mating of several box culverts 20 forms a conduit for the transportation of fluids through opening 206.

Figure 1:
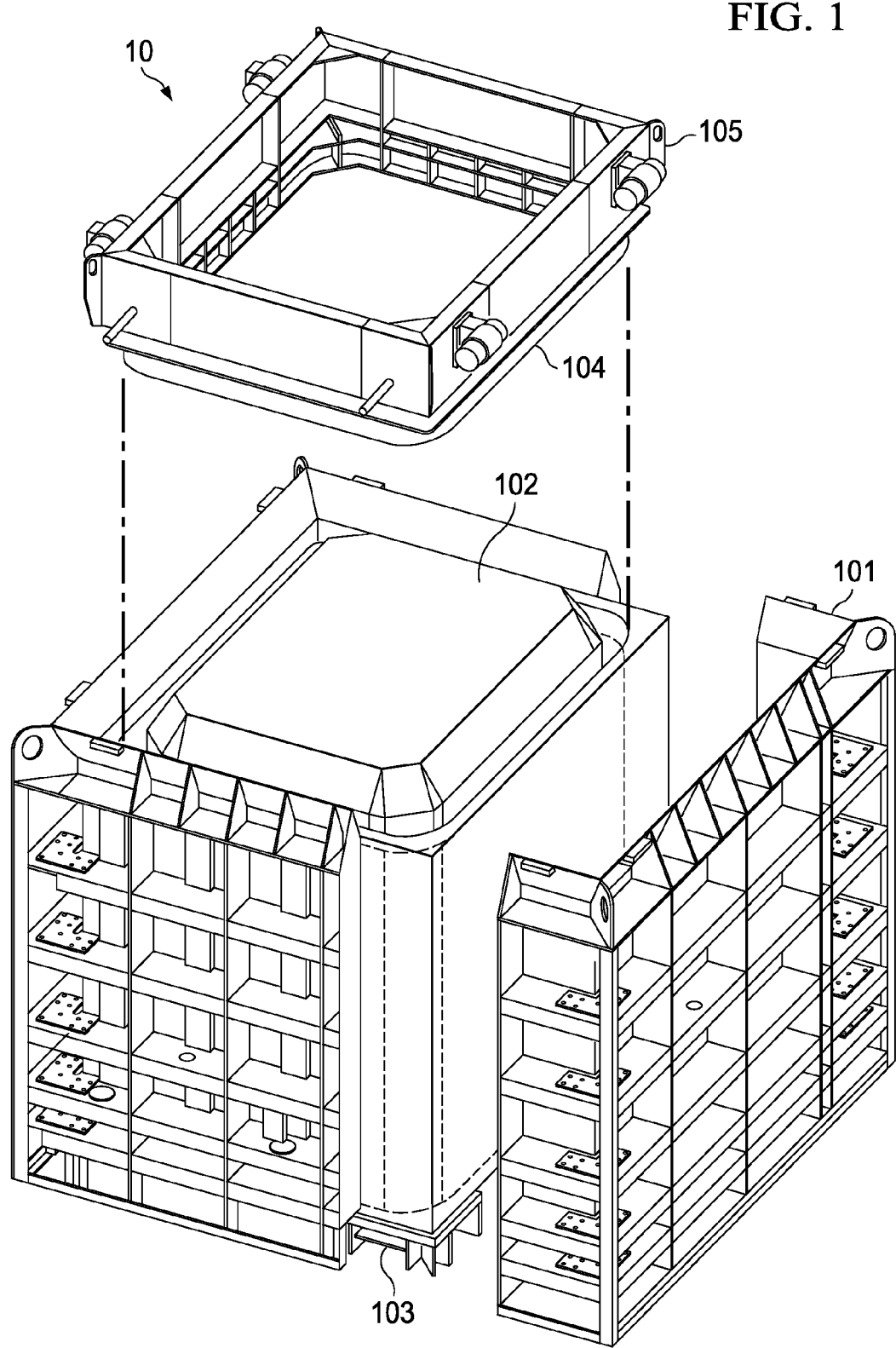
FIG. 1 shows a mold according to embodiments of the invention.

Box culvert 20 is made by pouring concrete into a mold assembly (mold) having the inner contours to form the shape of box culvert 20. FIG. 1 shows mold 10 according to embodiments of the invention. FIG. 1 shows that mold 10 includes form assembly (form) 101, core assembly (core) 102, pallet assembly (pallet) 103, header assembly (header) 104 and header frame assembly (header frame) 105. The components of mold 10—form 101, core 102, pallet 103, header 104 and header frame 105—may be coupled together by an operator to form mold 10 by any coupling means including nuts and bolts, holes and dowels and the like. These same coupling means may be used to couple together components of each of form 101, core 102, pallet 103, header 104 and header frame 105. Form assembly 101 defines the outer contours of the walls of box culvert 20, core assembly 102 defines the inner contours of these walls. Pallet assembly 103 forms male end 203 of box culvert 20 while header assembly 104 forms female end 205. Mold 10 and its components may be made from materials such as iron, steel, aluminum, plastic, composite material the like and combinations thereof.

Figure 3A:
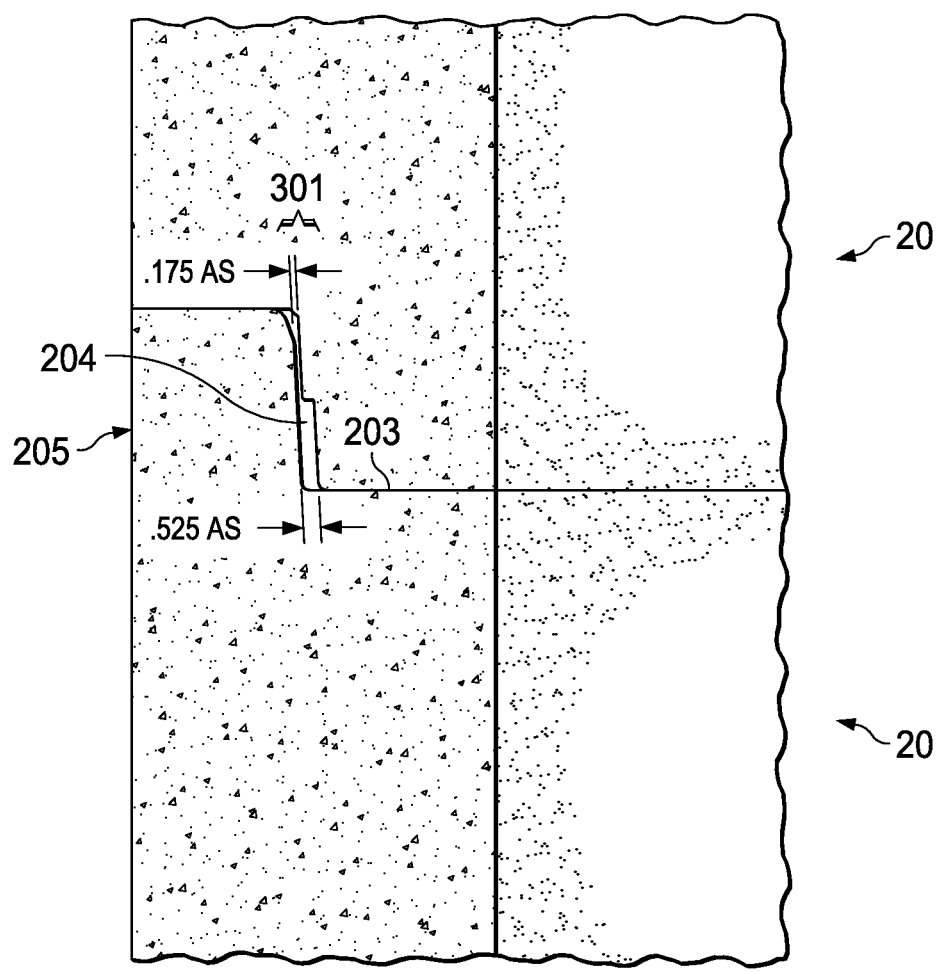
FIG. 3A shows a cross sectional view of a male end coupled to a female end of box culverts.

FIG. 3A shows the interaction of rubber gasket 204, male end 203 and female end 205. Proper interaction of these components is important in preventing fracturing of box culverts 20 during installation and in preventing leaks once installation is complete and fluid is allowed to flow through box culverts 20. Annular space 301 is the space between male end 203 and female end 205. Rubber gasket 204, ideally, should prevent flow of material through annular space 301. To do so, gasket 204 must be thick enough to seal annular space 301. On the other hand, if gasket 204 is too thick, it might cause the concrete to break during installation, i.e. male end 203 and/or female end 205 may break. Typically, before installation of rubber gasket 204 between male end 203 and female end 205, rubber gasket 204 will have a circular, triangular or rectangular cross sectional shape.

When male end 203 (which has rubber gasket 204 disposed on it) is fitted to female end 205, rubber gasket 204 is compressed into an oval shape. Rubber gasket 204 is usually compressed 60 to 75%. If rubber gasket 204 has to be compressed more than 60 to 75% to get it to fit in annular space 301, then the force applied to cause this compression is likely to cause the concrete of male end 203 and/or female end 205 to break. To prevent such damage to box culvert 20, the sizes of annular space 301 and rubber gasket 204 should always meet certain dimensional tolerances. ASTM C1677 specifies these tolerances. As such, ASTM C1677 specifies the size of rubber gasket 204 when it is applied to male end 203 of box culvert 20, which takes into account that rubber gasket 204 will be compressed by 60 to 75% when male end 203 and female end 205 are coupled together. In embodiments of the invention, annular space 301 is formed at a tolerance of plus or minus 50 thousandths of an inch (0.050 in.). Thus, if three components are bolted together on one side of a mold, then the aggregate tolerance of that side is plus or minus 0.030 in.

Figure 3B:
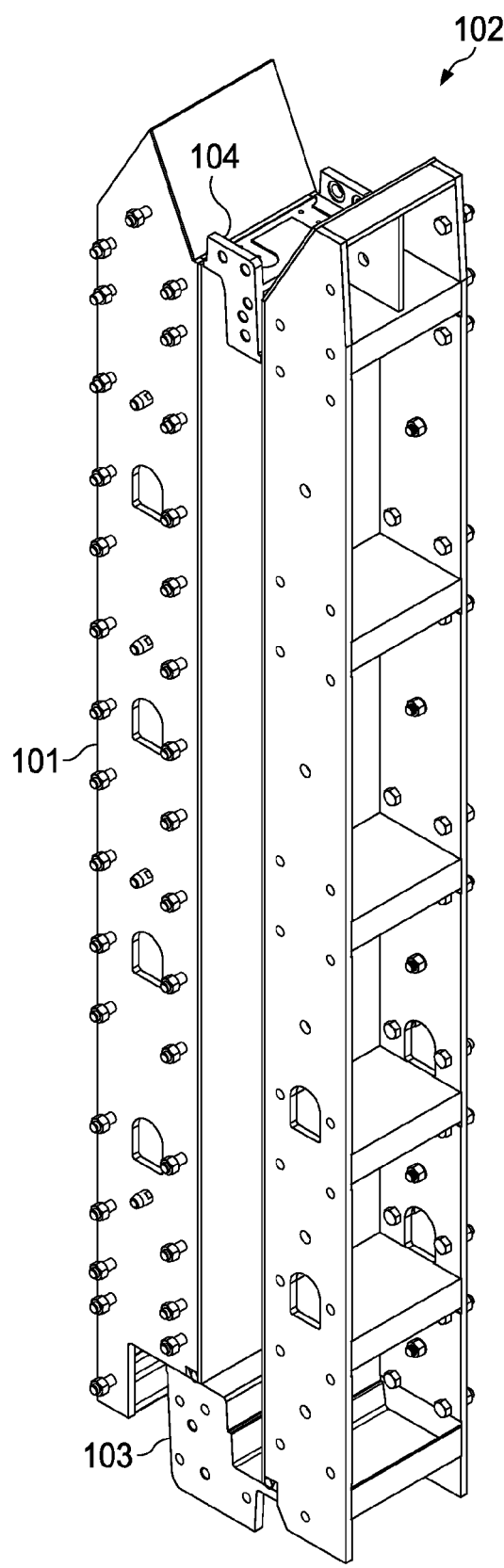
FIG. 3B shows components of a mold according to embodiments of the invention.

FIG. 3B shows components of a mold according to embodiments of the invention. Pallet assembly 103 forms male end 203. As such, pallet assembly 103 contributes to establishing whether the tolerance for annular space 301 is met. Pallet assembly 103 has to be produced at a tolerance level sufficient to allow the concrete manufacturer to manufacture male end 203 or box culverts 20 within the tolerances established by the ASTM standard. Similarly, header 104 forms female end 205 and its tolerance contributes to the tolerance female end 205. In embodiments of the invention appropriate tolerances of pallet assembly 103 and header 104 may be achieved by any one of (1) using relatively smaller components (2) stress relieving the components (3) using coupling plates to connect and align the components (4) using a pallet alignment guide to align a pallet and a form and combinations thereof.

Figure 4A:
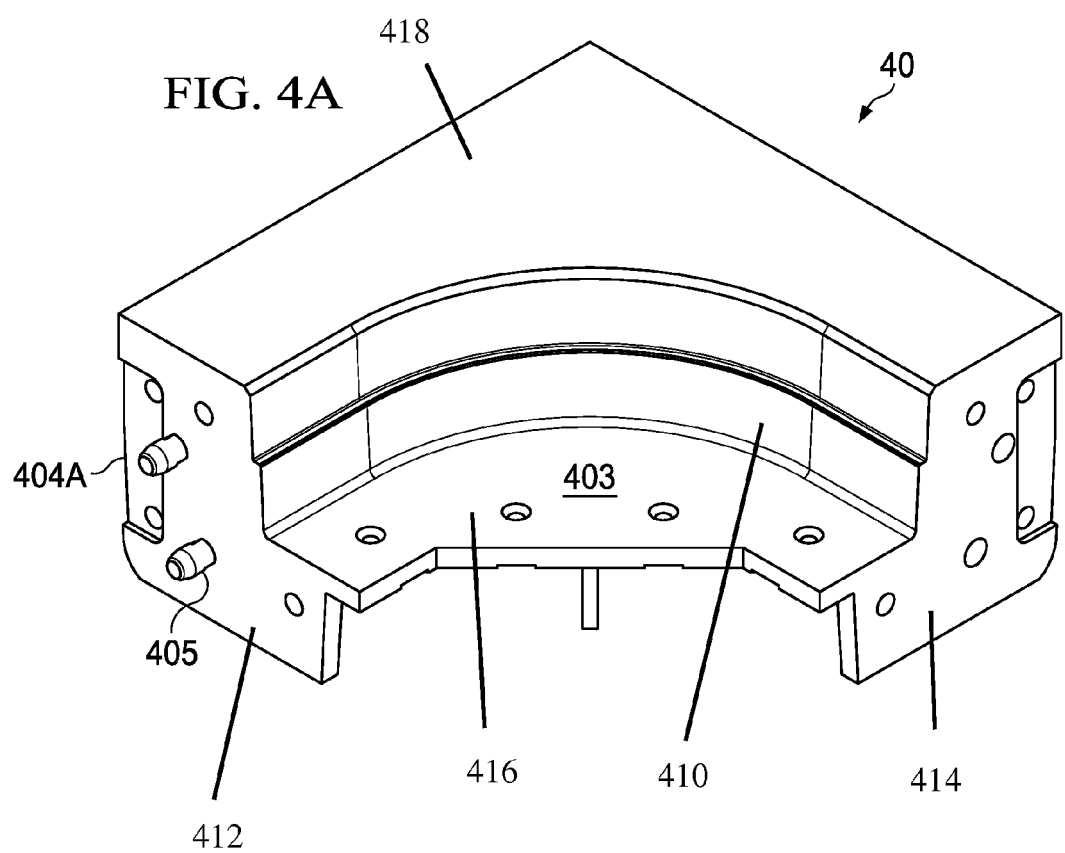
FIG. 4A shows a pallet universal corner adapted to receive coupling plates and other components to increase box culvert wall thickness according to embodiments of the invention.
Figure 4B:
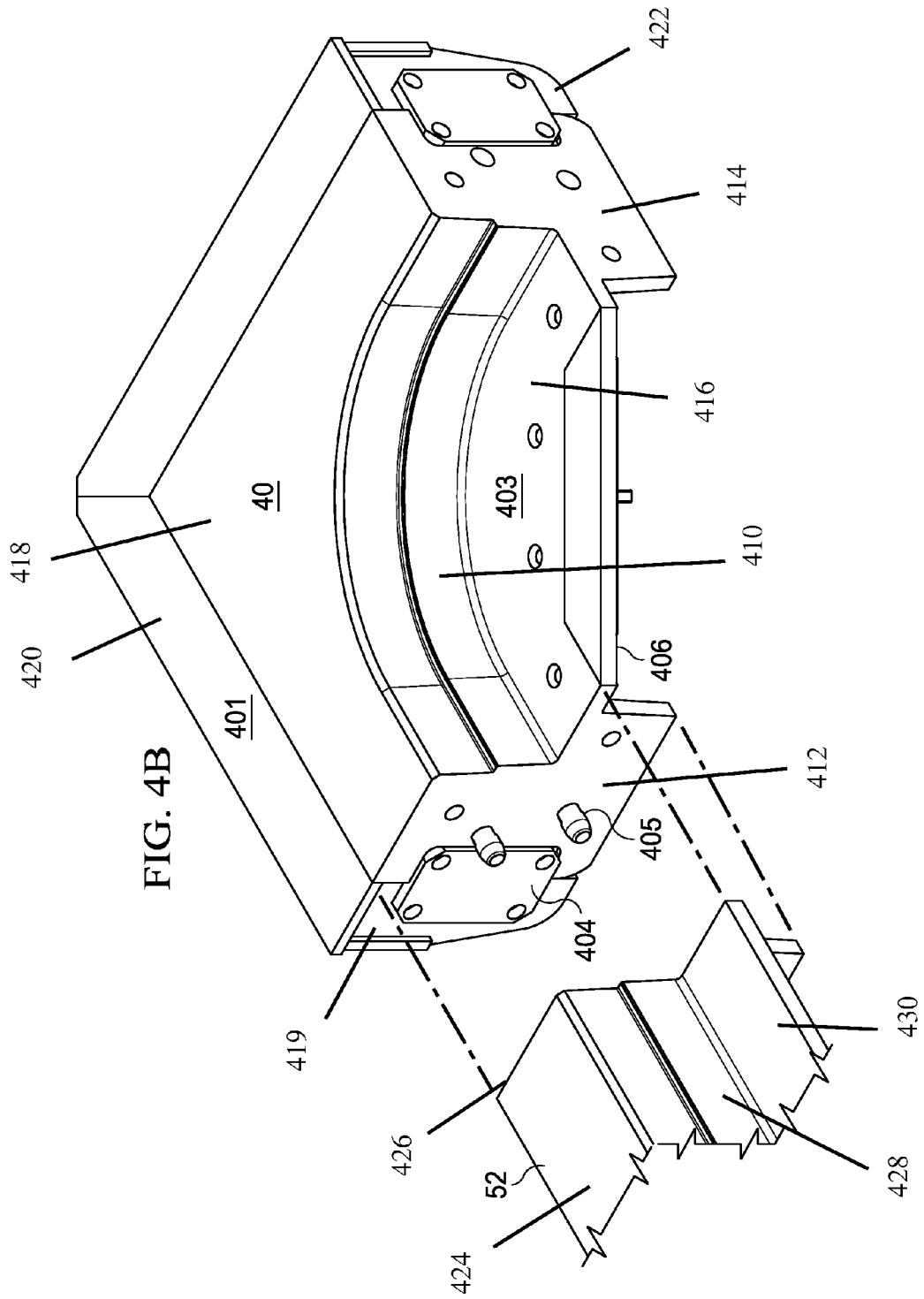
FIG. 4B shows a pallet universal corner adapted to increase box culvert wall thickness according to embodiments of the invention.

Embodiments of the invention employ a recessed coupling device to allow an extended top slab, bottom slab and side wall thickness to meet the ASTM requirements, for example, for a 12 ft. span product. The coupling device is constructed with very close tolerance to produce the required alignment of the bolt-on slab and wall spacers. The coupling device, also, provides the necessary structural integrity required in the modified pallet assembly. FIGS. 4A-4C shows a system for manufacturing components of molds, such as pallet 103, to have a smaller tolerance than the tolerance of the concrete culvert that it forms. Mold 10 is a modular system that involves bolting a plurality of sections together using dowels and holes (into which the dowels fit) and bolts and holes (into which the bolts fit). For example, dowel 405 fits into and is secured into a bolt hole of another component to which corner 40 is attached. It should be noted that other connecting/coupling means may be used in embodiments of the invention. Because several components are connected together to form mold 10, the tolerance of mold 10 is the sum of the tolerances of each of the sections of mold 10. Similarly, the tolerance of pallet 103 is the sum of the tolerance of the components of pallet 103.

In embodiments of the invention, the mold is designed so that the components that form male end 203, when connected together, have a particular tolerance. This tolerance must be small enough so that male ends 203 molded by this component meets the tolerance specification for male ends 203. One way of achieving the tolerance objectives for the components of mold 10 involves the use of connecting plates to connect different pieces of mold 10. For example FIGS. 4A-4C illustrate the connection of a pallet wall adapter to universal corner 40 in order to increase the wall thickness molded by mold 10.

FIG. 4A shows universal corner 40, which has a 2 ft.×2 ft., 6 in.-8 in. wall configuration according to embodiments of the invention. In order to change this configuration to a 2 ft.×2 ft., 8 in.-12 in. wall configuration, pallet wall adapter 401 is attached to the outer perimeter of universal corner 40. However, attaching pallet wall adapter 401 (FIG. 4B) to universal corner 40 can cause universal corner 40 to stress out of shape or the connections may be loose and allow the components to move around especially when the weight of the concrete poured into mold 10 is applied to the pallet 103. To avoid these problems, in embodiments of the invention, coupling plate 404 and/or a series of interlocking dowels 405 are used to couple pallet wall adapter 401 to universal corner 40. Coupling plate 404 may be made from materials such as iron, steel, aluminum, plastic, composite material the like and combinations thereof. Coupling plate 404 can have any shape including square, rectangle, circle, oval and combinations thereof. In addition to providing a means of connection, coupling plate 404 and/or a series of interlocking dowels 405 align pallet wall adapter 401 with universal corner 40. Coupling plate 404 can align pallet wall adapter 401 to universal corner 40 to achieve much smaller tolerances than dowels 405 can. One feature that helps connector plate 404 to achieve smaller tolerances is that each of pallet wall adapter 401 and universal corners 40 has an insert or a recess 404A for receiving connector plate 404.

As shown in FIGS. 4A and 4B, each of pallet wall adapter 401 and universal corner 40 has a recess 404A. In embodiments of the invention, recess 404A is machined to a depth of 0.252 inches and connector plate 404 manufacture to a width of 0.500. Therefore, there is a total of 0.004 inch clearance when connector plate 404 is disposed in recess 404A in embodiments of the invention. Nuts 408 and bolts 407 are used to clamp pallet wall adapter 401, connector 404 and universal corner 40 together, as shown in FIG. 4C. As shown, 0.25 in of the thickness of connector plate 404 is disposed in recess 404A of pallet wall adapter 401 and universal corner 40 and 0.25 in. is disposed in extension 52. Extension provides side wall 426, front wall 428, forming lip 430, and a forming surface, such as top wall 424. In embodiments, this system achieves 0.004 inch clearance horizontally and 0.002 inch clearance vertically.

Typically, wall adapter 401 with side walls 418, 422 and a forming surface, such as top wall 420, is added for spans greater than 8 ft. Increasing the wall thickness may also require additional haunch to be added (e.g. haunch 406 FIG. 4B). A haunch is a 45 degree section that joins two walls. For example, a top slab, and bottom slab does not join a side wall, at a 90 degrees angle. Instead of having a 90 degree connection, haunch 406 creates two 45 degree angles. In this way, load is transferred, which prevents a shear point forming as would occur in a 90 degree corner.

Figure 5A:
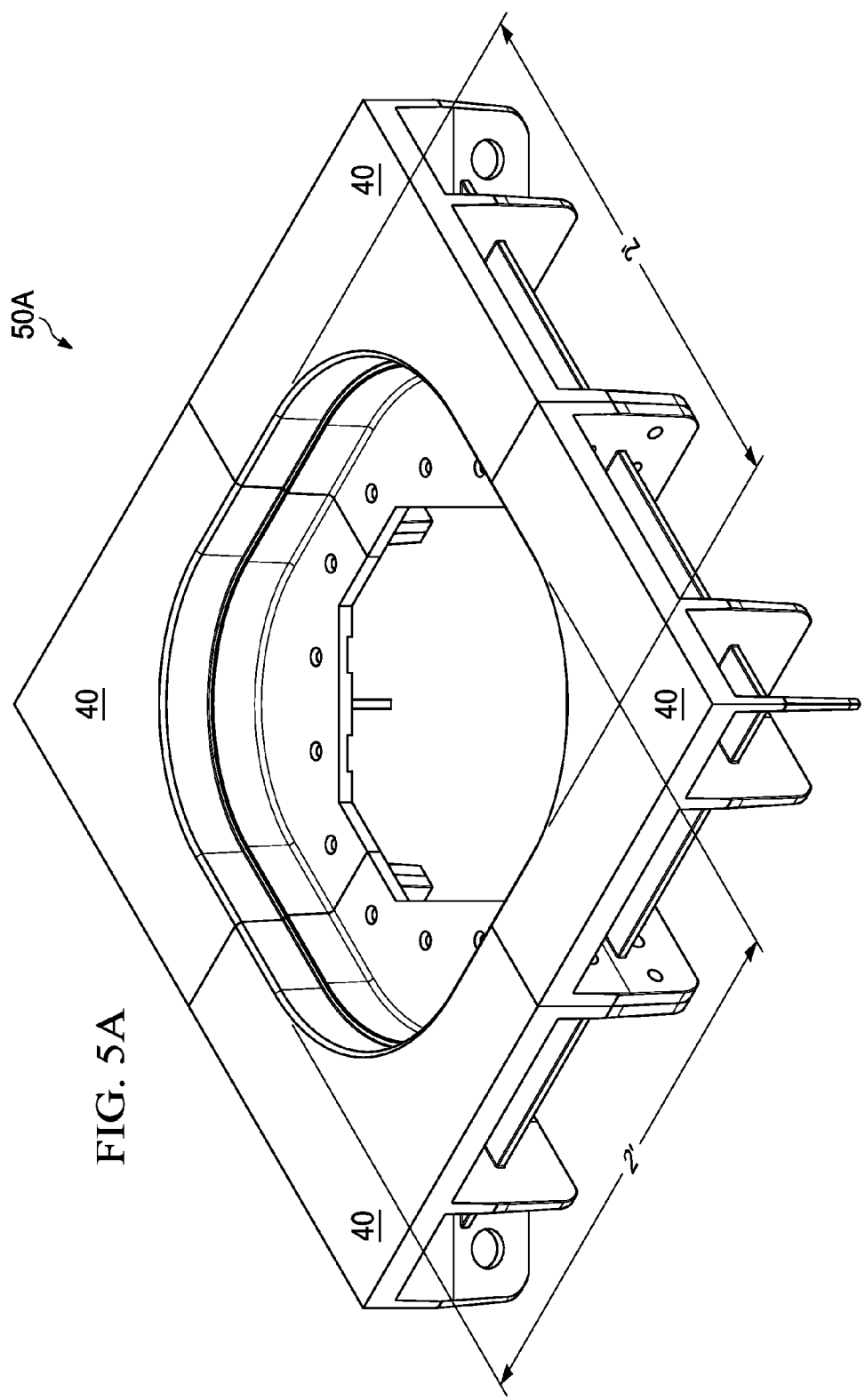
FIG. 5A-5C show pallet configurations according to embodiments of the invention.

FIG. 4A shows universal corner 40 according to embodiments of the invention. Universal corner 40 is a corner connection of pallet 103. Corner 40 provides front wall 410, side walls 412, 414, and forming lip 416. FIG. 5A shows four universal corners 40 assembled into their smallest configuration to create basic pallet 50A. As shown in FIG. 5A, basic form 50A has dimensions of 2 ft.times.2 ft. That is the nominal inside product dimensions are 2 ft.times.2 ft. as shown in FIG. 5A. Usually, the smallest pallet size has internal dimensions of 3 ft.times.2 ft. Any of universal corners 40 can be used as a left corner or a right corner of a pallet 103. Embodiments of the invention include using the coupling plates described above in conjunction with universal corners such as universal corners 40. However, the coupling plates may also be used with corners that are not universal i.e. corners configured as a left corner or a right corner (e.g. 3 ft.times.2 ft corners).

Tight tolerances may also be achieved by using relatively short components of mold 10. The longer a component of mold 10 is, the more the thermal contraction will be in that component. Also, by nature of tool pressure, when a long part is being machined, the tool pressure from one end to the other can change and cause a greater tolerance than would occur if the component was shorter. This theory can be tested by machining a 9 feet long component and then measuring it. Then three components, each 3 feet long, may be machined and bolted together and then measured. Comparing both measurements would reveal that the component with three pieces bolted together has a tighter tolerance than the 9 foot component. In embodiments of the invention the maximum length of a component such as an extension component is 5 feet long.

Shorter components of mold 10 also help to eliminate stress concentration in the weldment as the concrete is being formed. Additionally or alternatively, the components of the pallet corner 40, pallet extension 51 and/or 52, header corner 808 and the header extension 802 are thermally stress relieved prior to machining. Thus, embodiments of the invention include eliminating mechanical or thermal residual stress. There are two kinds of stress—heat induced and mechanical. During manufacture of the components of mold 10, welding can cause heat induced stress. Application of heat to metal tends to make the metal warp. Machining also tends to make the metal move out of shape when heat induced stress is present as a result of failure to thermally stress relieve.

Figure 5B:
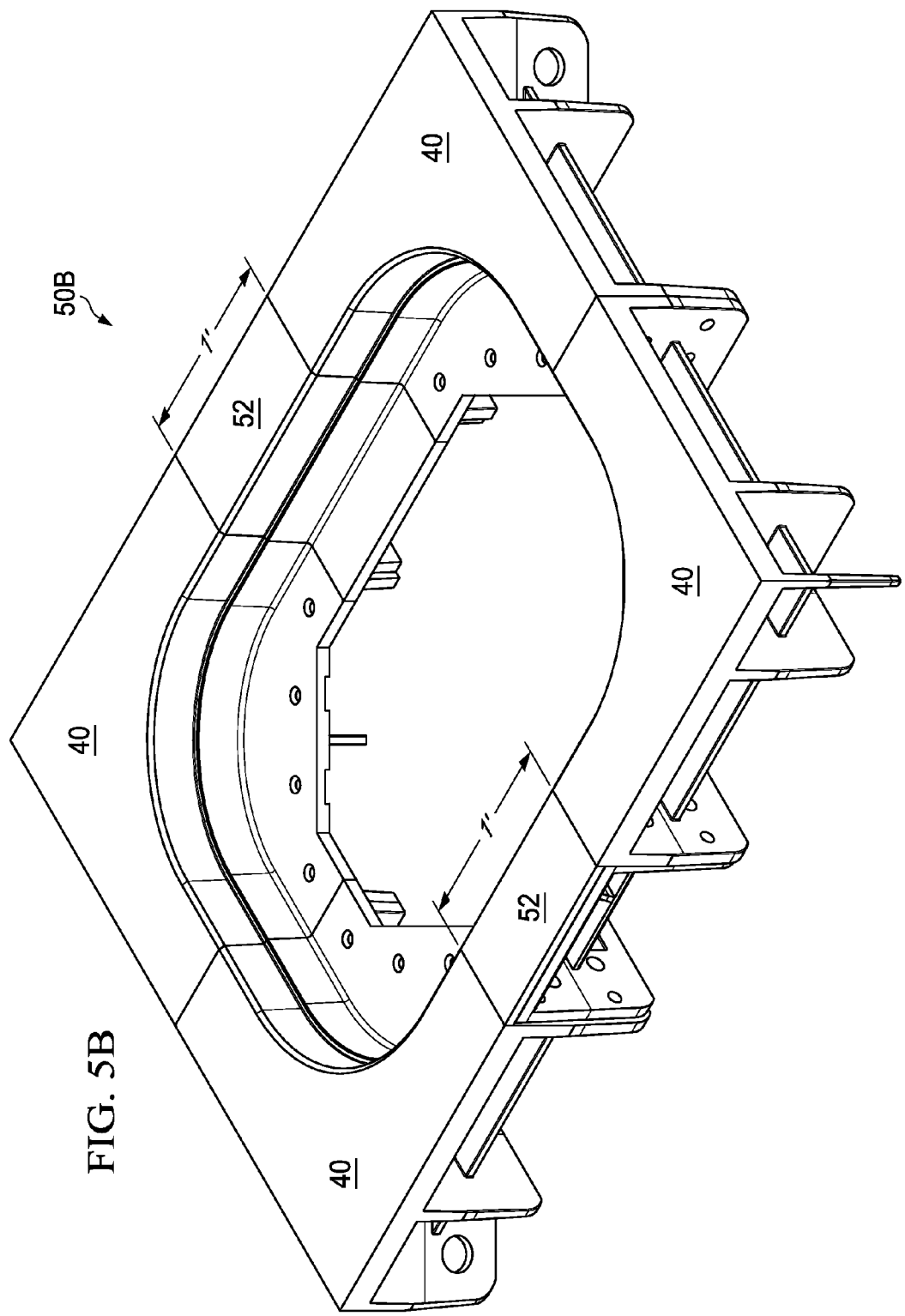
Figure 5C:
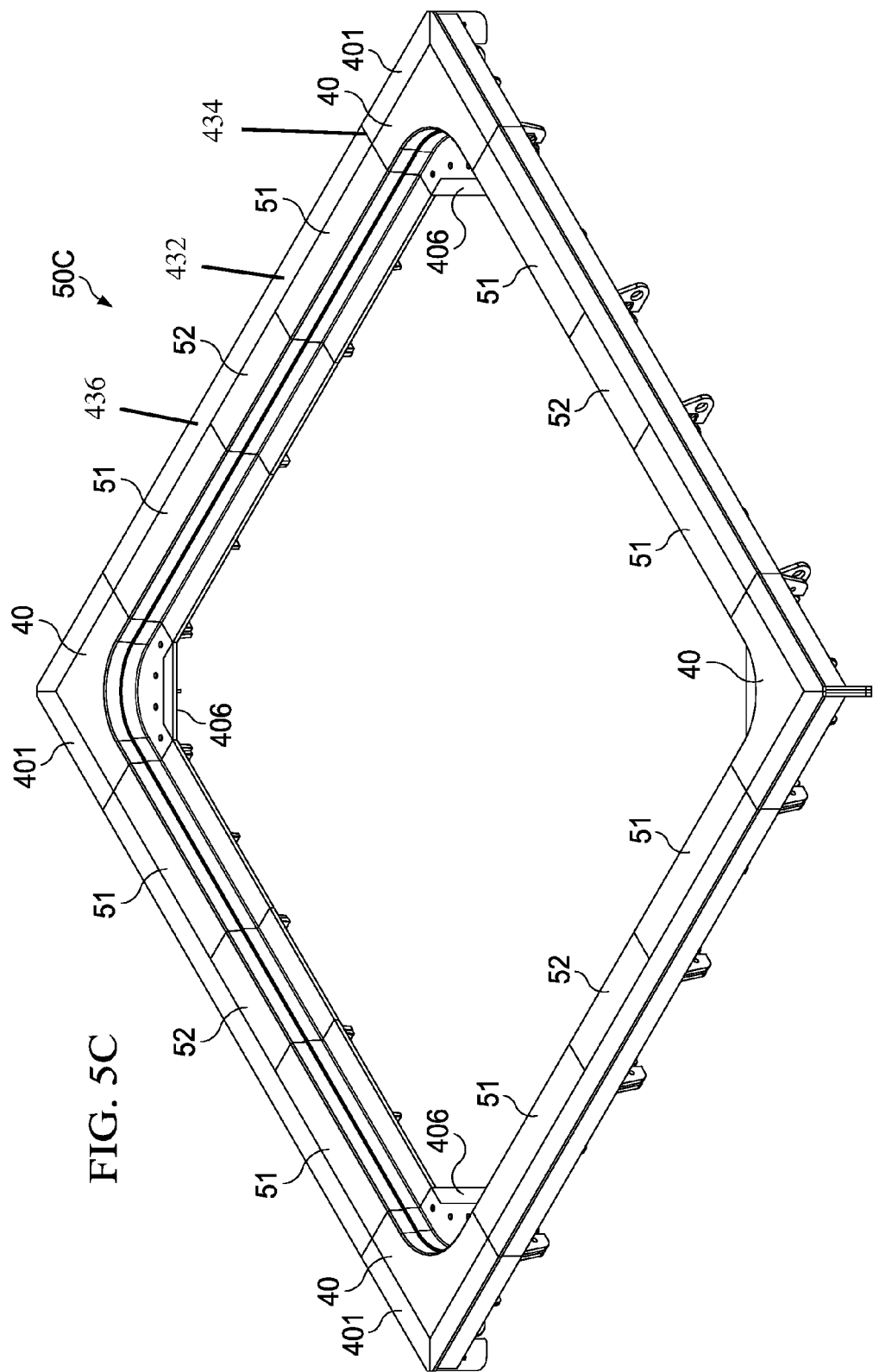

FIGS. 5B and 5C show pallet assembly 50B and 50C, which are made up of universal expandable 90 degree corner assemblies 40 with haunch spacers 406, wall spacers 401 and extensions 51 and/or 52 (FIG. 5C). To achieve pallet sizes greater than 2 ft.times.2 ft., pallet extensions 51 and 52 are added to basic from 50A shown in FIG. 5A by connecting pallet extensions 51 and 52 between universal corners 40. For example to achieve a 3 ft.times.2 ft. pallet setup starting from basic form 50 in FIG. 5A, a 1 ft. pallet extension, extension 52, is added to opposite sides of pallet basic form 50A to form pallet 50B as shown in FIG. 5B. Shown in FIG. 5C are several sections 51 and 52 connected to achieve the desired configuration of pallet 50C. In other words, multiple configurations of extensions are possible. Extensions used in mold 10, generally, have a length of 1 ft., 2 ft, 3 ft, 4 ft or 5 ft. Using any combination of these lengths of different configurations, pallet setups ranging from 3 ft.times.2 ft. through 12 ft.times.12 ft. configuration may be achieved. FIG. 5C also shows wall adapter 432 with side wall 434 and a forming surface, such as top wall 436, attached to the pallet assembly 50C to increase the thickness of the wall.

Whatever the configuration of the box culvert required, there are several ways the mold can be put together to achieve that configuration. The configuration that is ultimately used by the operator may be the most convenient one based on what the previous configuration was. For example, when an operator changes from one configuration to another, the recommended configuration may not be used because an alternate configuration may involve unbolting half of the mold and adjusting half of it to achieve the same configuration. In embodiments of the invention, mold 10 is capable of making box culverts covering all standard product sizes covered by ASTM C1433 and ASTM C1577 with a leak resistant joint in accordance with ASTM C1677. The product sizes for ASTM C1433 are 3'×2, 3'×3', 4'×2' 4'×3', 4'×4, 5'×3', 5'×4', 5'×5', 6'×3', 6'×4', 6'×5', 6'×6', 7'×4', 7'×5', 7'×6', 7'×7', 8'×4', 8'×5', 8'×6', 8'×7', 8'×8', 9'×5', ×9'×6', 9'×7', 9'×8', 9'×9', 10'×5', 10'×6', 10'×7', 10'×8', 10'×9', 10'×10', 11'×4', 11'×6', 11'×8', 11'×10', 11'×11', 12'×4', 12'×6', 12'×8', 12'×10' and 12'×12'. The product sizes for ASTM C1577 are the same as ASTM C1433. The specification for leak resistant joint according to ASTM C1677 has a angle of taper on the surface of the inside of the bell or groove and the outer surface of the spigot or tongue where the gasket seats of not more than 3.5 degrees measured from the pipe axis, except that tapers up to 5 degrees are not prohibited if proven adequate by plant test as specified in Section 9 of the specification and if approved by the owner. The minimum box culvert product size is 3 ft. span×2 ft. rise and the maximum product size is 12 ft. span× 12 ft. rise. According to embodiments of the invention, a pallet system having four universal 2 ft.×2 ft. corners, a maximum of four extensions of combined length of 10 feet, and a matching quantity of wall adapters of 4 inches in width may be used to produce box culvert sizes covered by ASTM C1433 and ASTM C1577 with a leak resistant joint in accordance with ASTM C1677.

Figure 6A:
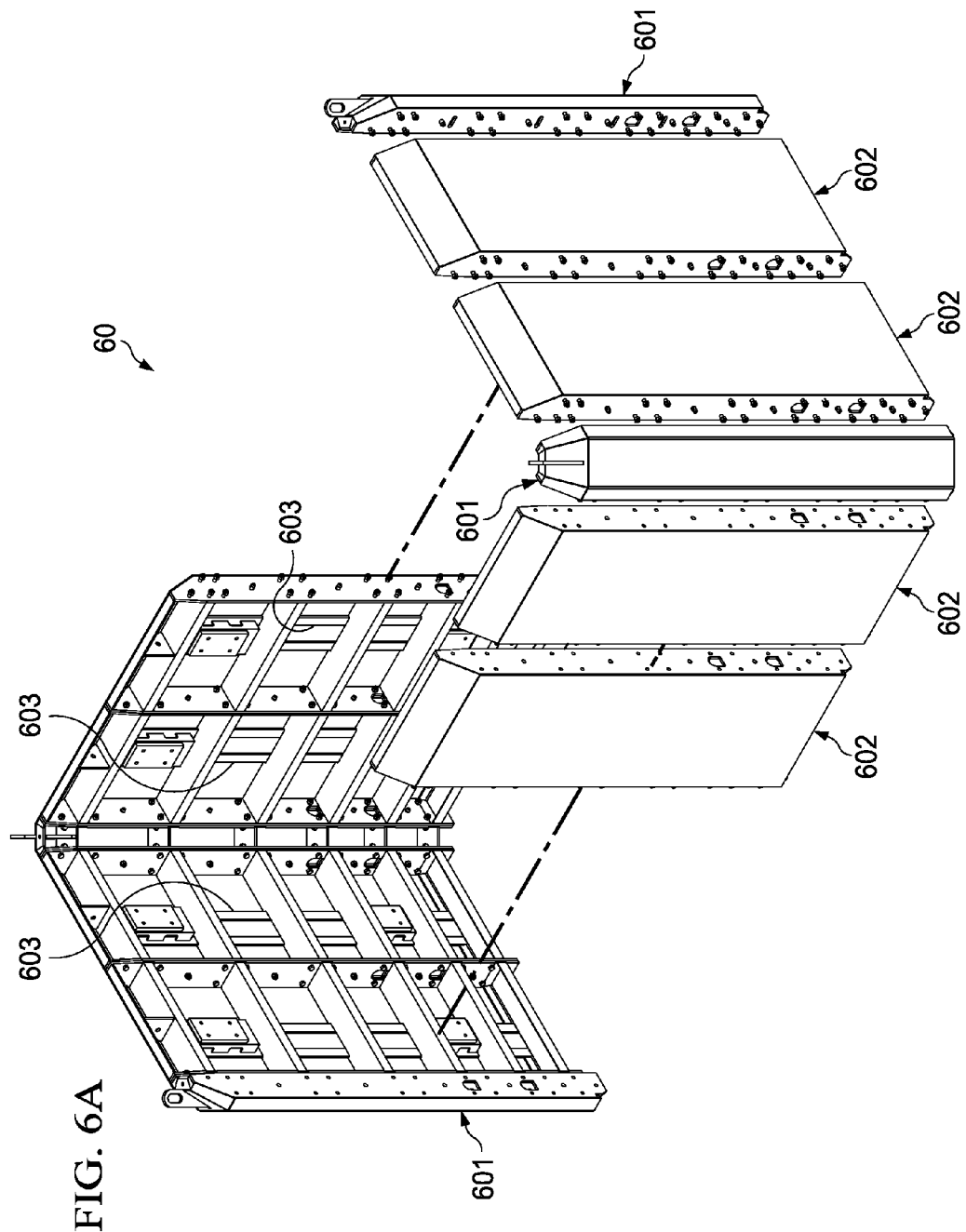
FIGS. 6A-6C show core configurations according to embodiments of the invention.
Figure 6B:
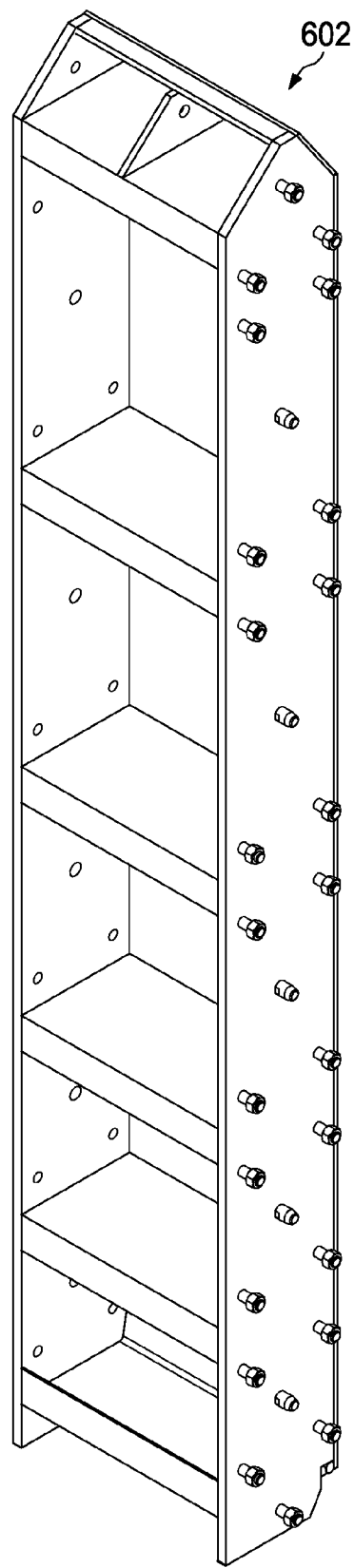
Figure 6C:
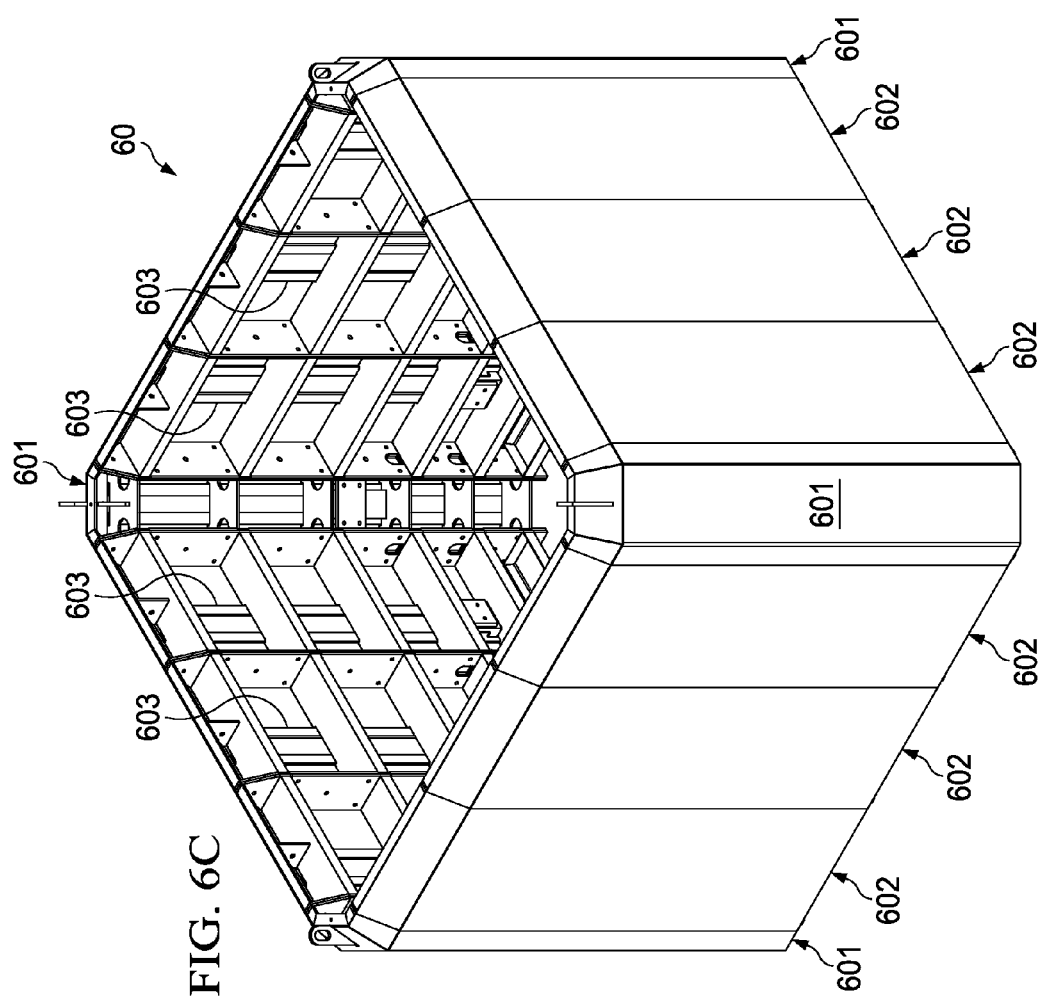

In embodiments of the invention, the assembly of a core is similar to the assembly of a pallet. FIGS. 6A to 6C show how a core may be assembled. For example, in FIG. 6A, core corner 601 may have a 2 ft. by ft.×2 or it is a 3 ft.×3 ft. configuration. Core 60 is made up of multiple core components with various haunch sizes and core extensions. The size of the core can be increased by connecting core extension 602 (FIG. 6B) between core corners 601 as shown in FIG. 6A to form core 60 shown in FIG. 6C. As described above, when larger haunch sizes are produced, additional universal core corners with the larger haunch size is required. The size of the haunch may vary, which necessitates a set of universal core corners for each haunch size greater than the 8 in. minimum haunch size. It should be noted that core 60 includes vibration transfer bar 603. Vibration transfer bar 603 is connected to a vibrator on core 60. Vibration transfer bar 603 transmits vibrations from the vibrator and allows the skin of core 60 to vibrate evenly. In embodiments of the invention vibration transfer bar 603 runs vertically on core 60. However, vibration transfer bar 603 may run in any direction such as horizontally or diagonally or combinations thereof.

Figure 7A:
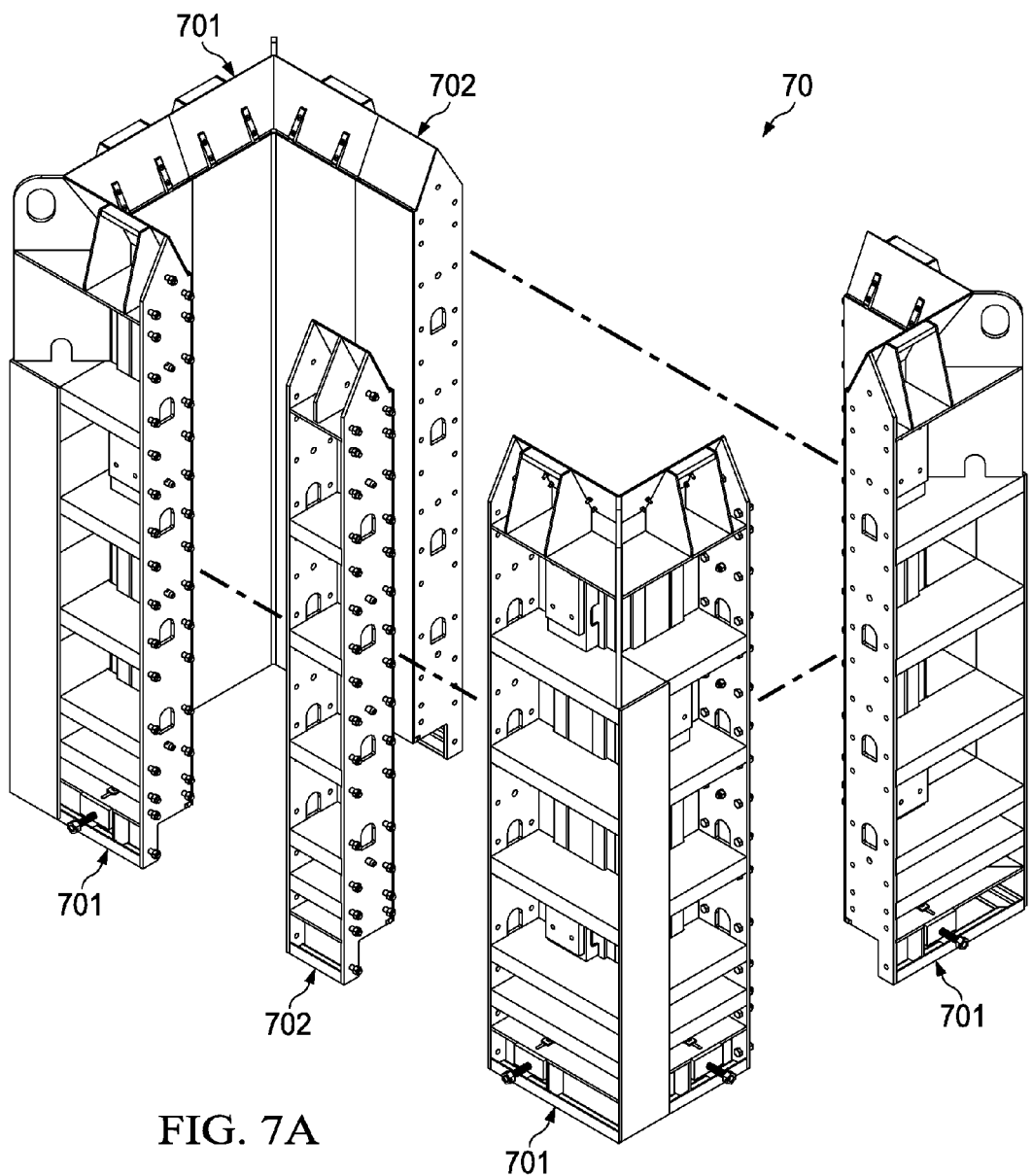
FIGS. 7A-7C show form configurations according to embodiments of the invention.
Figure 7B:
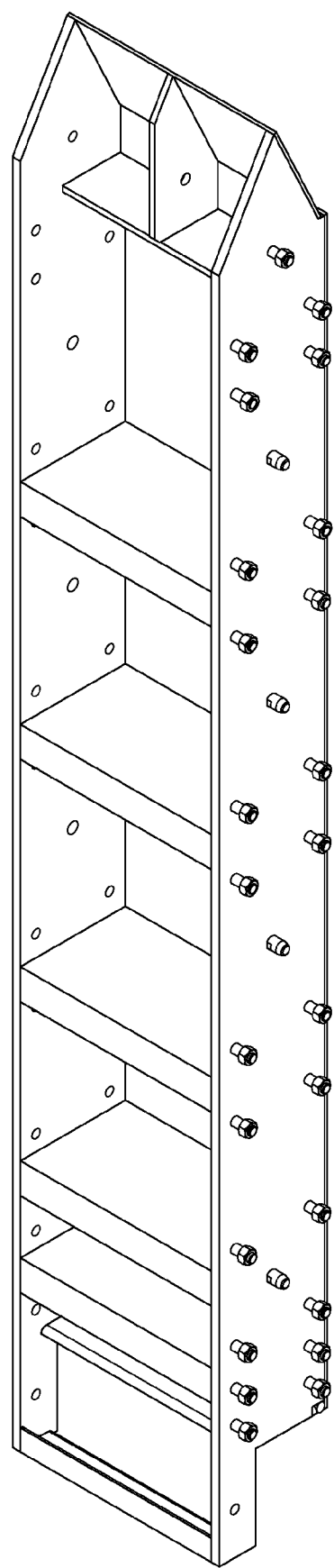
Figure 7C:
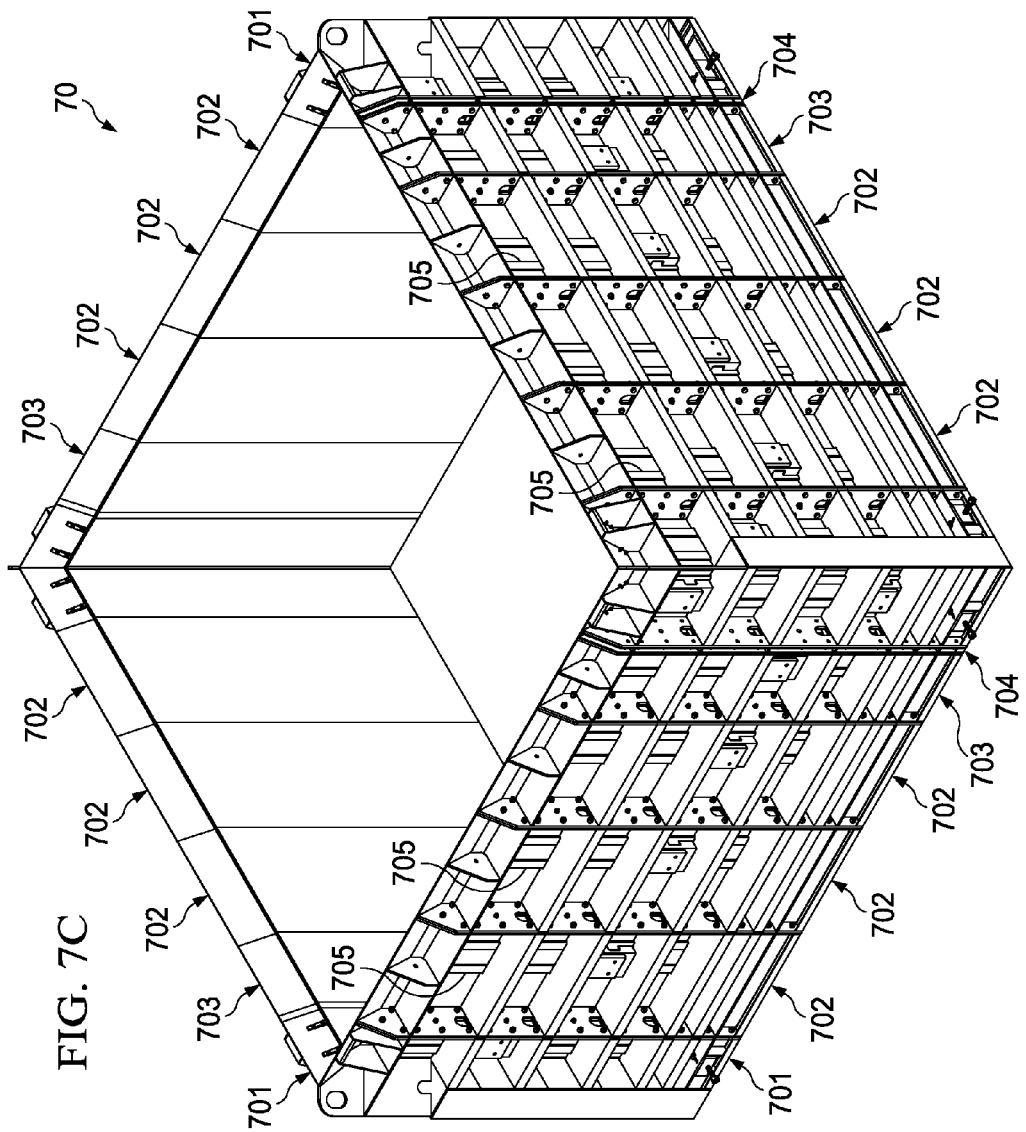

The assembly of a form, according to embodiments of the invention, is shown by FIGS. 7A to 7C. Form 70 is made up of four universal expandable 90 degree corner assemblies 701 with two form extensions 702 which is in the basic or minimum rise configuration, therefore, no additional bolt in slab and wall spacers are required. The slab and wall spacers 704, are used to increase the slab and side wall thickness from the minimum dimension built into the basic form assembly as shown in FIG. 7C. Form extensions 702 are used to make dimensional changes in the span and/or rise of concrete culvert 20. For example, in FIG. 7A, form corner assemblies 701 may have a 2 ft. by ft.×2 or it is a 3 ft.×3 ft. configuration. The size of the form can be increased by connecting form extension 702 (FIG. 7B) between form corners 701 as shown in FIG. 7A to create form 70 shown in FIG. 7C. It should be noted that form 70 includes vibration transfer bar 705. Vibration transfer bar 705 is connected to a vibrator on form 70. Vibration transfer bar transmits vibrations from the vibrator and allows the skin of form 70 to vibrate evenly. In embodiments of the invention, vibration transfer bar 705 runs vertically on form 70. However, vibration bar 705 may run in any direction such as horizontally or diagonally or combinations thereof.

Figure 8A:
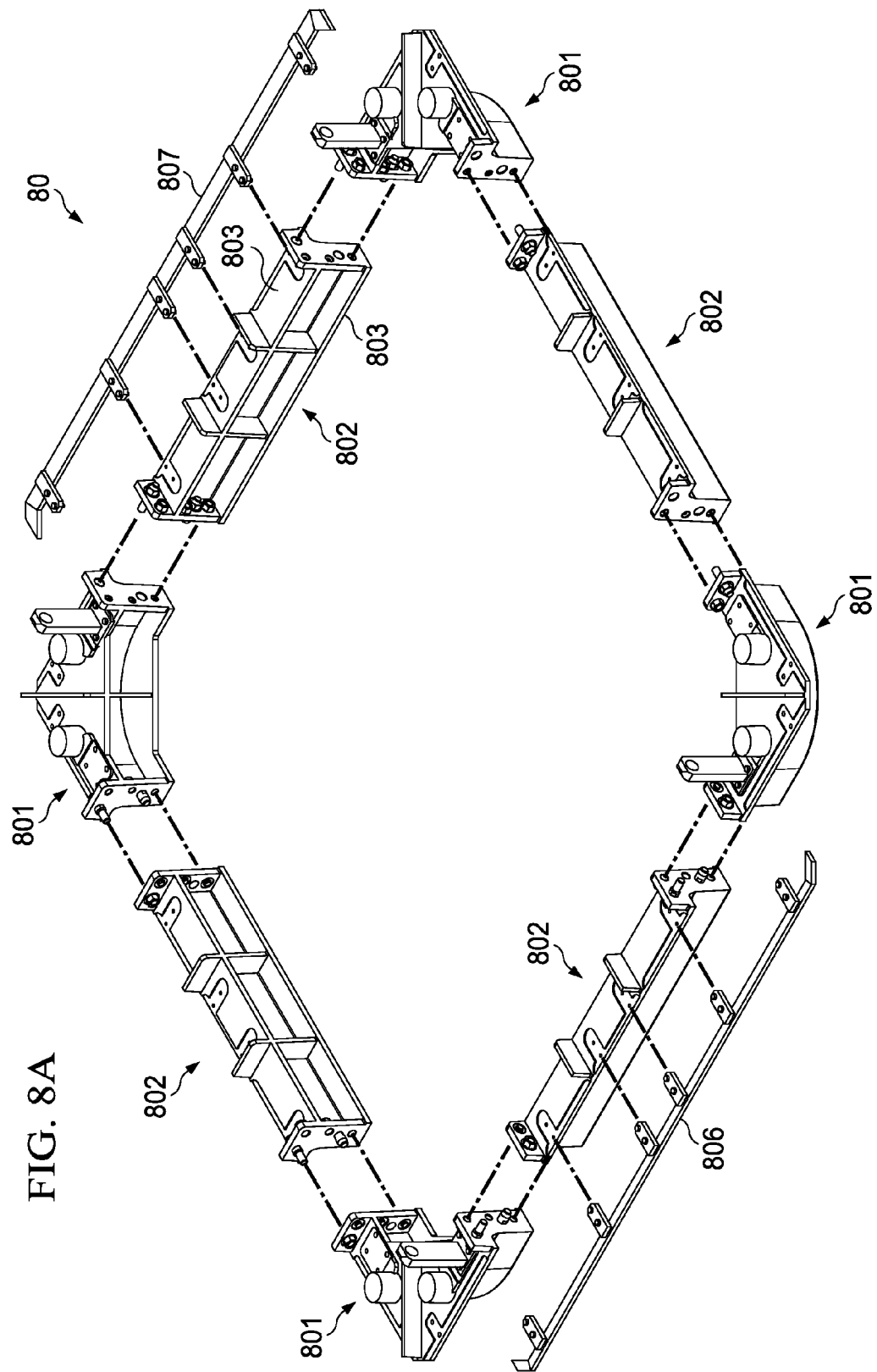
FIGS. 8A and 8B show header configurations according to embodiments of the invention.
Figure 8B:
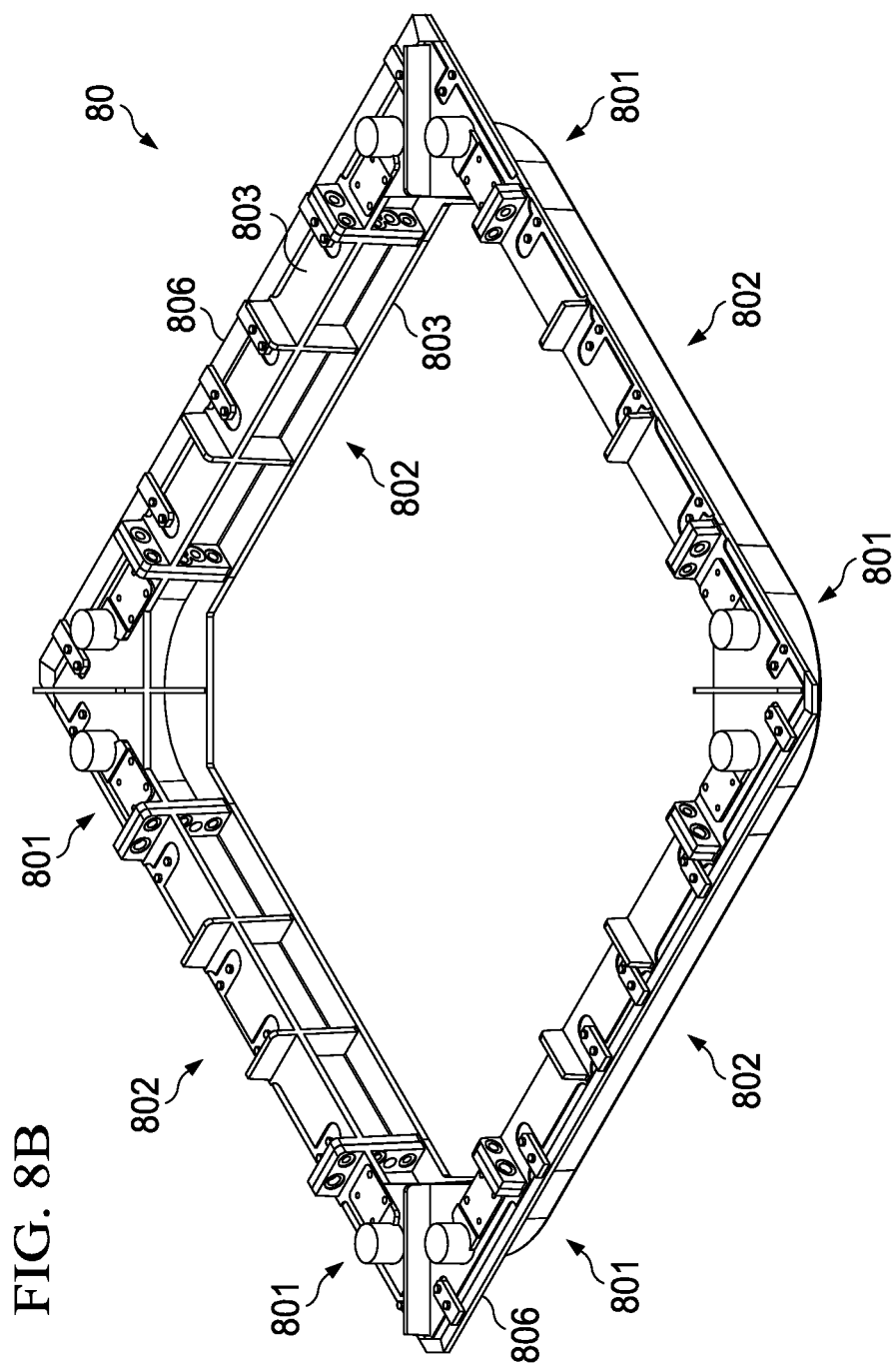

The assembly of a header is shown by FIGS. 8A to 8B. A universal format may be used for the corners of the header. However, non universal corners may also be used. As shown in FIGS. 8A to 8B, header 80 is made up of universal expandable 90 degree corner assemblies 808, a top slab adapter 807, a bottom slab adapter 806 and extensions 802. In FIG. 8A, header corner 808 may have a 2 ft. by ft.×2 or it is a 3 ft.×3 ft. configuration. The size of the header can be increased by connecting header extension 802 (FIG. 8B) between header corners 808 as shown in FIG. 8A to form header 80 shown in FIG. 8C. Header 80 is machined to allow the using of a bolt-on haunch adapter to provide the required larger haunch size when producing spans greater than 8 feet.

If the producer of the box culvert so desires, culverts with haunch sizes of 8 in., 9 in., 10 in., 11 in, and 12 in. may be made with molds according to embodiment of the invention. In this case it is necessary to add a set of universal core corners for each of those haunch sizes. Most producers tend to restrict the haunch size to 8 in., 10 in. and 12 in. When using different sets of universal core corners; all corner sets can share a common set of core extensions to make the various size products.

It should be noted that coupling plate 404 has been described herein as being used on a pallet assembly. However, coupling plate 404 may be used in other assemblies of mold 10 such as core assembly 102, pallet assembly 103, header assembly 104 and header frame assembly 105.

In assembling mold assembly 10, there needs to be a pallet guide to center the pallet assembly within the form assembly. To do this, operators sometimes use trial and error by loosening components of the mold assembly, make adjustments by hitting the components with a hammer and then retighten the components. This is repeated until the operator is satisfied that the pallet is properly centered.

Figure 9A:
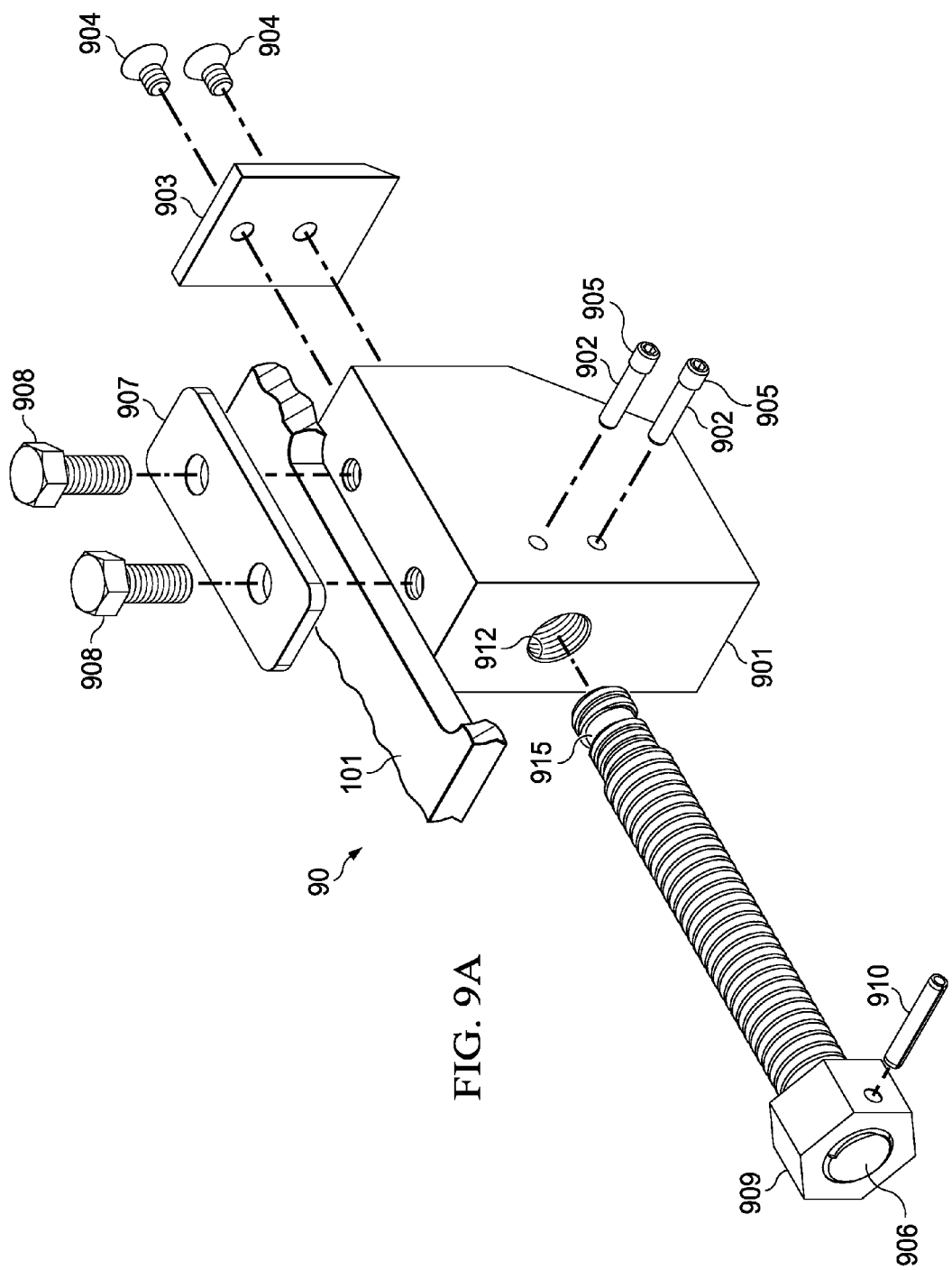
FIGS. 9A and 9B show a pallet guide assembly according to embodiments of the invention.
Figure 9B:
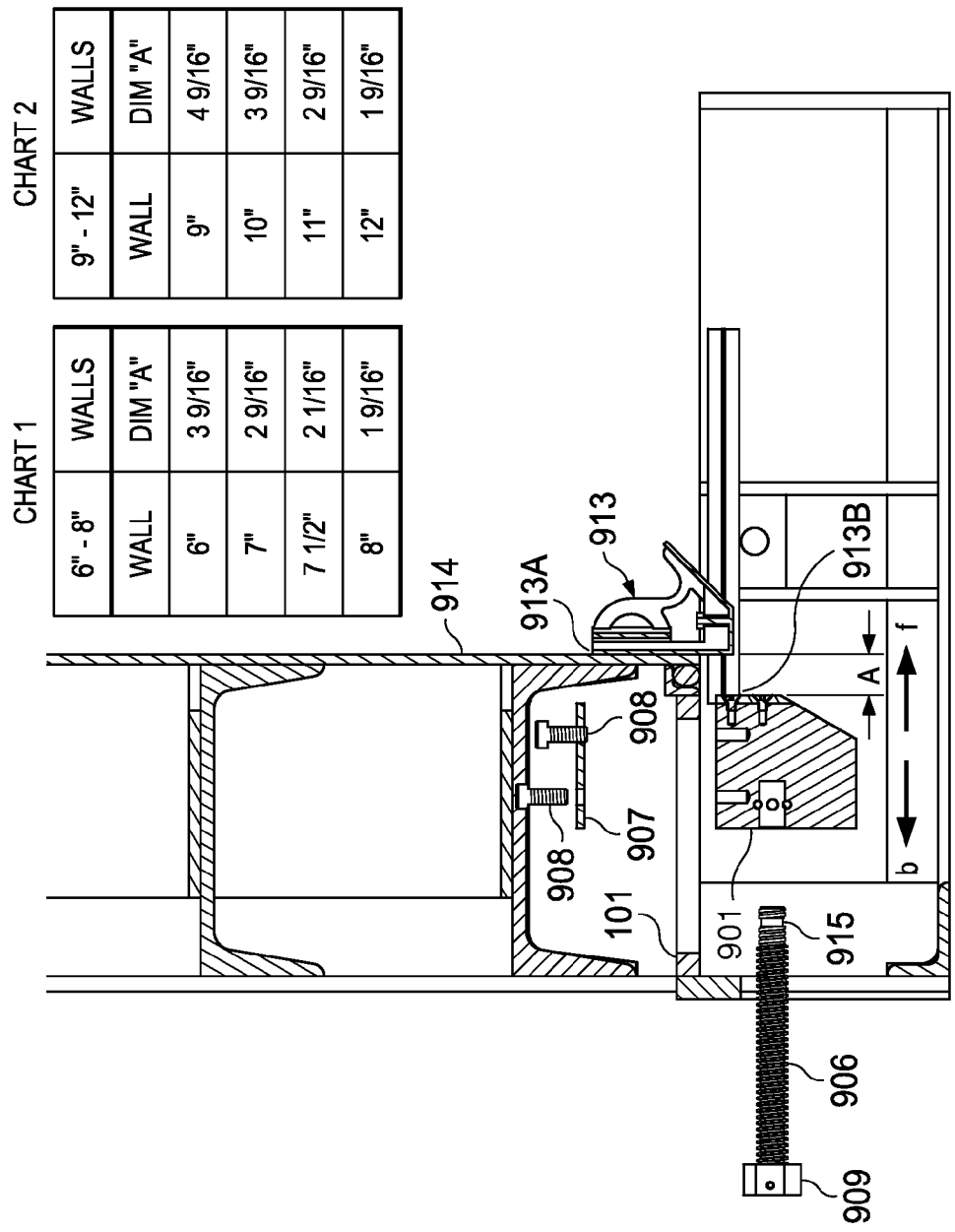

FIG. 9A shows an exploded view of pallet guide assembly 90 according to embodiments of the invention. Pallet guide assembly 90 is used to set the pallet at a desired location in relation to the form using a pallet guide adjustment mechanism. The desired location is based on a wall thickness of a concrete culvert to be produced. Pallet guide assembly 90 includes pallet guide adjustment shaft 906, which fits through a hole in the form and into a hole in pallet guide base 901. Pallet guide adjustment shaft 906 may include groove 915 and screw threads. Pallet guide base 901 may include pallet guide wear plate 903. Dowel pins 902 (having socket head set screw 905 attached thereto) fits within groove 915 at the top and bottom of shaft 906 such that when shaft 906 is turned it will cause pallet guide base 901 to move in a forward direction (f) or backward direction (b) as shown in FIG. 9B. In other words, dowel pins lock shaft 906 within pallet guide base 901.

It should be noted that, in embodiments of the invention, one or more dowel pins may be used to lock shaft 906 within pallet guide base 901. Further, any mechanism for locking shaft 906 within pallet guide base 901 may be used. In embodiments of the invention, to accurately align pallet 103 with form 101 to achieve a particular wall thickness, tri-square 913 is set to dimension "A". Dimension "A" depends on the wall thickness desired. Charts 1 and 2 in FIG. 9B shows relationships between desired wall thickness and dimension "A" according to embodiments of the invention. Screws 908 are then loosened. After tri-squire 913 is set to the desired dimension, nut 909 including spring roll pin 910 is turned so that pallet guide base 901 moves forward or backward, until tri square section 913A touches skin 914 and tri square section 913B touches pallet guide wear plate 903 as shown in FIG. 9B. The distance between tri square section 913A and tri square section section 913B is dimension "A". Screws 908 are then tightened. At this point, pallet 103 and form 101 are accurately set in a configuration to produce box culverts at the desired wall thickness. Pallet guide assembly may be made from materials such as metal (e.g. iron, steel, aluminum etc.), plastic composites and combinations thereof.

While assembling core assembly 102 is in some respects similar to assembling other components of mold 10 (such as pallet 103, form 101 and header 104) assembling core mold 102 poses additional challenges. When formed, core assembly 102 essentially creates a box. Much of the mechanism for connecting the components of core assembly 102 is within the box. As such, it is difficult and uncomfortable for an operator to make connections between components when assembling core assembly 102. This is so especially when the core assembly is small such as with a 2 foot rise configuration that is too small to allow a worker to enter and complete the assemblage of the core assembly.

Figure 10B:
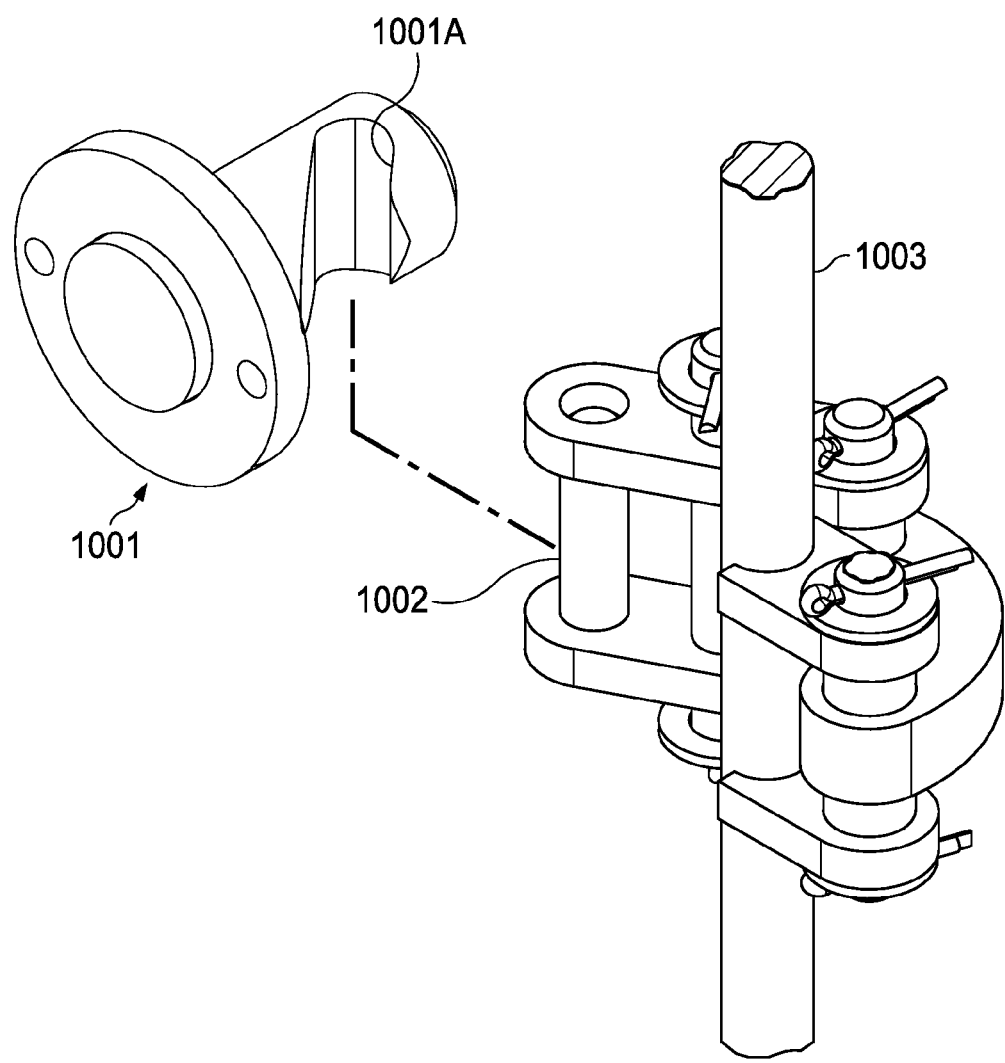

FIGS. 10A to 10C shows a core lock assembly according to embodiments of the invention for addressing the above described problem. Core assembly corners 102A and 102B having a 2 foot rise are to be connected to partially form core assembly 102. Core assembly corners 102A and 102B may be placed on the ground with skin 1007 facing down. Bolts are installed through bolt holes into joint plates 1005 and 1006. The joint plate bolts are then tightened to fasten joint plates 1005 and 1006 to core assembly corners 102A and 102B respectively. Core assembly corner 102A is lifted, for example with a crane, and turned to mate with core assembly corner 102B, or vice versa. According to embodiments, a core lock mechanism including latch pin 1002 is coupled to core clamp shaft 1003 as shown in FIG. 10B. Latch pin 1002 is adapted to fit into groove 1001A of lock pin 1001 in a locked position. To lock core assembly corners 102A and 102B together, core clamp shaft 1003 is turned until latch pin 1002 is locked into groove 1001A of lock pin 1001. Core clamp shaft 1003 may be turned by using, for example, a ¾ in. drive ratchet or break over bar temporarily attached to core clamp shaft 1003. Core clamp shaft 1003 and the drive ratchet or break over bar forms a mechanism that extends outside of the core. Once core assembly corners 102A and 102B are locked together, they may be stood upright. It should be noted that the core locking mechanism may be used with other components of core 102 such as core corners, core extensions, core spacers and combinations thereof.

Figure 11:
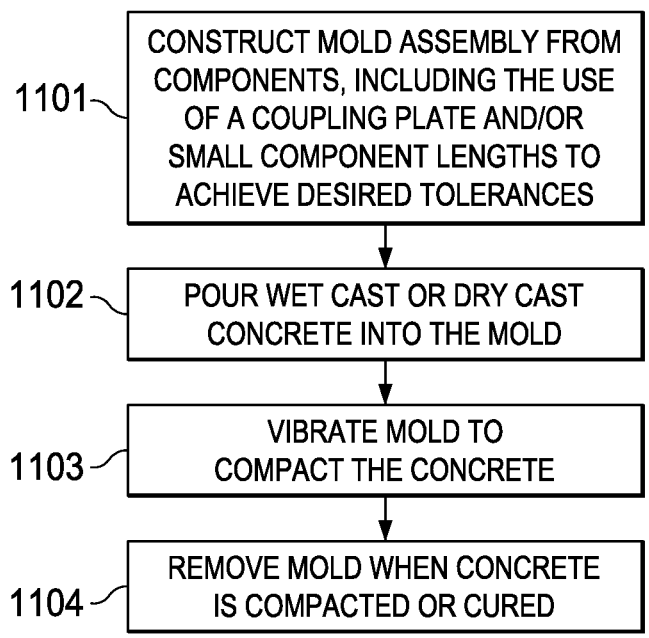
FIG. 11 shows a method of making a box culvert according to embodiments of the invention.

FIG. 11 shows method 110 for making a box culvert according to embodiments of the invention. To produce a box culvert the operator has to first put the mold, for example, mold 10 together at the desired configuration as shown in step 1101. This may require making a size change to an existing mold by adding or removing extension from the pallet, header, core or form. The change could also involve rearranging the various components into a different configuration. In embodiments of the invention, the connections between different components, in particular the components of the pallet, involve the use of a coupling plate and recess to align the different components properly with each other. As such, the desired tolerances for the male end formed by the pallet can be achieved. Alternatively or additionally, small component lengths may be used. The components may also have been mechanically or thermally stress relieved. Once the proper configuration has been achieved, at step 1102, wet cast or dry cast concrete is placed into mold 10. Mold 10 is then vibrated to allow the concrete to be compacted in step 1103. Vibration may be created with vibrators or vibrators and vibrator transfer bars as discussed above. Once the concrete is compacted or cured, mold 10 is removed. Because the pallet has been made to a particular tight tolerance the box culvert is produced at the desired tight tolerance after the mold is removed to allow curing.

Box culvert 20 may be made by modular mold equipment systems suitable for various methods of wet cast and dry cast production such as form strip and static casting (egg laying production) methods. In the egg laying process a pallet is placed on the floor, a form is placed on it and a core placed within the pallet. The mold is then filled with concrete. After the concrete is compacted or cured, the core is removed first and then the form is removed. The form and core are then set up with a new pallet and the process repeated.

In the form strip process, the core is stationary and the pallet and the form are picked up together and placed over the core (the pallet and the form are latched together). After the concrete is compacted or cured, the fresh concrete is picked up off the core and transported with the form and the pallet. The pallet is set down in the designated curing area of the plant. The difference between egg-laying and form strip is that form strip requires much larger crane capacity because a pallet, form and the concrete are lifted with the form strip as opposed to the form alone being lifted in the egg-laying method.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A modular pallet of a mold for producing a concrete culvert with an opening located interior of an outer wall of the concrete culvert, said pallet comprising:
    a corner component;
    a forming surface of the corner component assisting with the formation of the outer wall of a first thickness;
    a wall adapter component attachable to the corner component to extend outward from the corner component away from the opening to increase the thickness of the outer wall of said concrete culvert produced by said modular pallet;
    a forming surface of the wall adapter component that increases the thickness of the outer wall formed by the corner component;
    a coupling plate aligning the forming surface of the wall adapter component exterior to the forming surface of the corner component when securing the corner component and the wall adapter component;
    a recess of the corner component configured to receive the coupling plate;
    a recess of the wall adapter component configured to receive the coupling plate; and
    the coupling plate securing the wall adapter component exterior to the corner component.

2. The modular pallet of claim 1 wherein said coupling plate comprises at least one hole for receiving a bolt, said bolt adapted to clamp said coupling plate into the recess of the wall adapter component.

3. The modular pallet of claim 1 wherein clearance between said coupling plate and a perimeter of the recess of the wall adapter component or corner component is a maximum of 0.004 inches.

4. The modular pallet of claim 1 wherein said mold produces box culverts in a range of 3 ft.×2 ft. span to 12 ft. span×12 ft. rise.

5. The modular pallet of claim 1 wherein said coupling plate comprises material selected from the list consisting of: metal and plastic.

6. The modular pallet of claim 1 wherein said coupling plate comprises a plurality of holes and wherein at least one of said plurality of holes is for receiving a bolt to clamp said coupling plate to said wall adapter and at least one of said plurality of holes is for receiving another bolt to clamp said coupling plate to said corner component.

7. The modular pallet of claim 1 wherein said coupling plate comprises a shape selected from the list consisting of: square, rectangle, circle, oval and combinations thereof.

8. The modular pallet of claim 1 further comprising:
    a form having a vibrator disposed on said form; and
    at least one vibration transfer bar connected to said vibrator and disposed on said form.

9. The modular pallet of claim 1 wherein the coupling of said coupling plate at said recesses of the corner component and the wall adapter component cooperates to align and provide structural support to said corner component and said wall adapter component.

10. The modular pallet of claim 1 wherein the pallet produces a male end of the culvert, said male end is formed at a tolerance of 0.004 inches.

11. A modular pallet of a mold for producing a concrete culvert with an opening located interior of an outer wall of the concrete culvert, said pallet comprising:
    a pallet extension assisting with the formation of the outer wall with a first thickness, the pallet extension comprising a front wall, a top wall, and a side wall;
    a forming lip extending horizontally outward from the front wall of the pallet extension wherein the forming lip is located below the top wall of the pallet extension;
    a wall adapter component attachable to the pallet extension to increase the thickness of the outer wall from the first thickness to a second thickness, the wall adapter component comprising a top wall and a side wall;
    a coupling plate aligning the top wall of the wall adapter component exterior to the top wall of the pallet extension when securing the wall adapter component and the pallet extension;
    a recess of the pallet extension located on the side wall and extending inwards from a rear edge of the side wall towards the front wall, the recess of the pallet extension configured to receive the coupling plate;
    a recess of the wall adapter component located on the side wall and extending to a front edge of the side wall of the wall adapter component, the recess of the wall adapter component configured to receive the coupling plate; and
    the coupling plate securing the wall adapter component exterior to the pallet extension.

12. The pallet of claim 11 wherein the wall adapter component abuts the rear edge of the side wall of the pallet extension when the wall adapter is secured to the pallet extension wherein the wall adapter component increases the thickness of the outer wall by the width of wall adapter component.

13. The pallet of claim 11 wherein the pallet extension is located between the wall adapter component and the forming lip when the pallet extension is secured to the wall adapter component.

14. The pallet of claim 11 wherein the coupling plate extends away from the forming lip beyond the rear edge of the side wall of the pallet extension when the coupling plate is attached to the pallet extension, the coupling plate providing a surface for attachment of the pallet extension with the wall adapter component.

15. A modular pallet of a mold for producing a concrete culvert with an opening located interior of an outer wall of the concrete culvert, said pallet comprising:
- a corner component assisting with the formation of the outer wall with a first thickness, the corner component comprising a front wall, a top wall, and a side wall;
- a forming lip extending horizontally outward from the front wall of the corner component wherein the forming lip is located below the top wall of the corner component;
- a wall adapter component attachable to the corner component to increase the thickness of the outer wall from the first thickness to a second thickness, the wall adapter component comprising a top wall and a side wall;
- a coupling plate aligning the top wall of the wall adapter component exterior to the top wall of the corner component when securing the wall adapter component and the corner component;
- a recess of the corner component located on the side wall and extending from a rear edge of the side wall of the corner component towards the front wall, the recess of the corner component configured to receive the coupling plate;
- a recess of the wall adapter component located on the side wall and extending to a front edge of the side wall of the wall adapter component, the recess of the wall adapter component configured to receive the coupling plate; and
- the coupling plate securing the wall adapter component exterior to the corner component.

16. The pallet of claim 15 wherein the wall adapter component abuts the rear edge of the side wall of the corner component when the wall adapter component is secured to the corner component wherein the wall adapter component increases the thickness of the outer wall by the width of the wall adapter component.

17. The pallet of claim 15 wherein the corner component is located between the wall adapter component and the forming lip when the corner component is secured to the wall adapter component.

18. The pallet of claim 15 wherein the coupling plate extends away from the forming lip beyond the rear edge of the side wall of the corner component when the coupling plate is attached to the corner component, the coupling plate providing a surface for attachment of the corner component with the wall adapter component.

19. The pallet of claim 11 wherein the coupling plate coupled to the wall adapter component and the pallet extension aligns the top wall of the wall adapter component with the top wall of the pallet extension to increase the surface area of a top surface formed by the top wall of the wall adapter component and the top wall of the pallet extension.

20. The pallet of claim 15 wherein the coupling plate coupled to the wall adapter component and the corner component aligns the top wall of the wall adapter component with the top wall of the corner component to increase the surface area of a top surface formed by the top wall of the wall adapter component and the top wall of the corner component.

21. A modular pallet of a mold for producing a concrete culvert with an opening located interior of an outer wall of the concrete culvert, said pallet comprising:
- a pallet extension;
- a forming surface of the pallet extension assisting with the formation of the outer wall of a first thickness;
- a wall adapter component attachable to the pallet extension to extend outward from the pallet extension away from the opening to increase the thickness of the outer wall of said concrete culvert produced by said modular pallet;
- a forming surface of the wall adapter component that increases the thickness of the outer wall formed by the pallet extension;
- a coupling plate aligning the forming surface of the wall adapter component exterior to the forming surface of the pallet extension when securing the pallet extension and the wall adapter component;
- a recess of the pallet extension configured to receive the coupling plate;
- a recess of the wall adapter component configured to receive the coupling plate; and
- the coupling plate securing the wall adapter component exterior to the pallet extension.

* * * * *